(12) United States Patent
Ogawa

(10) Patent No.: US 7,406,015 B2
(45) Date of Patent: Jul. 29, 2008

(54) INFORMATION RECORDING MEDIUM, METHOD OF GENERATING FLAG, METHOD OF PRODUCING INFORMATION RECORDING MEDIUM, METHOD OF ADJUSTING RECORDING CONDITIONS OF INFORMATION RECORDING MEDIUM, METHOD OF RECORDING FOR INFORMATION RECORDING MEDIUM AND INFORMATION RECORDING DEVICE

(75) Inventor: Masatsugu Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 395 days.

(21) Appl. No.: 10/620,577

(22) Filed: Jul. 17, 2003

(65) Prior Publication Data

US 2004/0017747 A1 Jan. 29, 2004

(30) Foreign Application Priority Data

Jul. 18, 2002 (JP) ............................. 2002-209622
Jun. 26, 2003 (JP) ............................. 2003-183607

(51) Int. Cl.
*G11B 7/00* (2006.01)
(52) U.S. Cl. ................................ 369/53.27; 369/47.5
(58) Field of Classification Search ........................ None
See application file for complete search history.

(56) References Cited

U.S. PATENT DOCUMENTS

| 6,101,159 A | 8/2000 | Shoji et al. |
| 6,157,609 A | 12/2000 | Shoji et al. |
| 6,175,541 B1 | 1/2001 | Shoji et al. |
| 6,178,148 B1 | 1/2001 | Shoji et al. |
| 6,181,654 B1 | 1/2001 | Shoji et al. |
| 6,188,656 B1 | 2/2001 | Shoji et al. |

(Continued)

FOREIGN PATENT DOCUMENTS

EP 1 223 577 A2 1/2002

(Continued)

OTHER PUBLICATIONS

Patent Abstracts of Japan, vol. 1997, No. 11, Nov. 28, 1997, & JP 09 198660A, Ricoh Co. Ltd.) Jul. 31, 1997; (abstract and document).

(Continued)

*Primary Examiner*—Joseph Feild
*Assistant Examiner*—Joseph Haley
(74) *Attorney, Agent, or Firm*—Foley & Lardner LLP

(57) ABSTRACT

An 11T single signal and a 3T single signal are recorded on a DVD-RW at the optimum recording power P1 and a recording power P2 of an intensity of 85% with relative to the optimum recording power P1, and then these signals are reproduced to calculate asymmetry values A1 and A2. If a difference (A1-A2) between both asymmetry values is equal to or greater than a reference value of 0.05, it is judged that a method using the asymmetry value is available for the OPC, and if the difference is less than a reference value of 0.05, it is judged that the method is not available. Then, the judgment result is recorded on the DVD-RW as a flag. A DVD drive judges whether or not the asymmetry value is used for the OPC on the basis of the flag.

46 Claims, 10 Drawing Sheets

U.S. PATENT DOCUMENTS

| | | | |
|---|---|---|---|
| 6,212,142 B1 | 4/2001 | Shoji et al. | |
| 6,233,211 B1 | 5/2001 | Shoji et al. | |
| 6,269,062 B1 * | 7/2001 | Minemura et al. | 369/47.53 |
| 6,275,462 B1 * | 8/2001 | Masaki et al. | 369/116 |
| 6,349,081 B1 | 2/2002 | Shoji et al. | |
| 6,359,846 B1 | 3/2002 | Shoji et al. | |
| 6,424,608 B1 * | 7/2002 | Takeuchi | 369/47.53 |
| 2001/0005343 A1 | 6/2001 | Shoji et al. | |
| 2003/0086345 A1 | 5/2003 | Ueki | |
| 2005/0088940 A1 * | 4/2005 | Toda et al. | 369/53.27 |
| 2005/0180286 A1 | 8/2005 | Shoji et al. | |
| 2005/0185558 A1 | 8/2005 | Shoji et al. | |
| 2005/0201241 A1 | 9/2005 | Shoji et al. | |

FOREIGN PATENT DOCUMENTS

| | | |
|---|---|---|
| JP | 10-064064 | 3/1998 |
| JP | 11-273073 | 10/1999 |
| JP | 2000-231727 | 8/2000 |
| JP | 2002-025060 A | 1/2002 |
| JP | 2003-151160 A | 5/2003 |
| JP | 2003-203341 | 7/2003 |

OTHER PUBLICATIONS

"DVD Specifications for Re-recordable Disc (DVD-RW) Part 1 Physical Specifications Version 1.1", Nov. 1999.

"DVD Specifications for Recordable Disc for General (DVD-R for General) Part 1 Physical Specifications Version 2.0", May 2000.

* cited by examiner

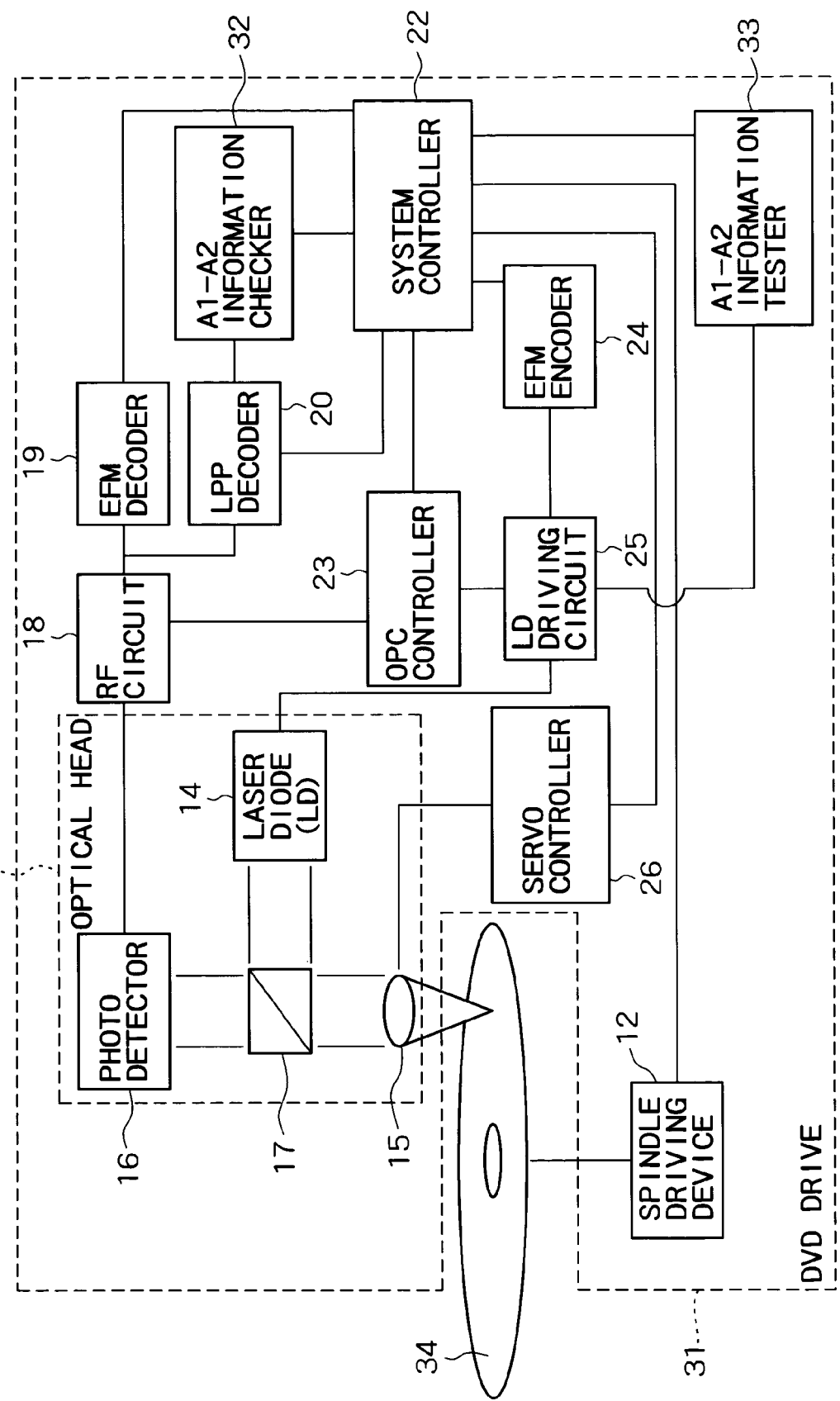

INFORMATION RECORDING MEDIUM, METHOD OF GENERATING FLAG, METHOD OF PRODUCING INFORMATION RECORDING MEDIUM, METHOD OF ADJUSTING RECORDING CONDITIONS OF INFORMATION RECORDING MEDIUM, METHOD OF RECORDING FOR INFORMATION RECORDING MEDIUM AND INFORMATION RECORDING DEVICE

BACKGROUND OF THE INVENTION

1. Field of the Invention

The present invention relates to an optical information recording medium such as DVD-RW (Digital Versatile Disc ReWritable), a method of generating a flag to be recorded onto the information recording medium, a method of producing the information recoding medium, a method of adjusting recording conditions of the information recording medium, a method of recording for the information recording medium, and an information recording device and particularly relates to an information recording medium capable of selecting a recording speed, the method of producing the same, a flag generating method, a method of adjusting recording conditions of the information recording medium, a method of recoding for the information recording medium, and the information recording device.

2. Description of the Related Art

Recently, recordable type optical discs such as a DVD-R, a DVD-RW, and a DVD+RW have been developed. Some optical discs among them are sold in a market together with information recording devices (drives) which record and reproduce information on the optical disc. When the information recording devices record information onto the optical disc, the devices confirm whether or not a power of a laser light for carrying out recording (hereinafter, referred to as a recording power) has a proper value. This confirmation operation is generally called OPC (Optimum Power Control), which is very important operation for the recordable type disc.

The optical information recording device has an optical head. The optical head emits a laser light, which is irradiated onto a recording surface of the optical disc. At the time, a recording power of the laser light to be irradiated onto the optical disc is changed corresponding to various factors. Therefore, the optical information recording device may allow the optical head to emit a laser light having a predetermined power, but in fact, the practical power of the laser light to be irradiated onto the optical disc is often shifted off from a proper range of the power. Then, a function of the OPC is that the recording power is calibrated based on an information obtained from a practical recorded signal.

For example, as described in the DVD-RW standard statement "DVD Specifications for Re-recordable Disc (DVD-RW) Part 1 PHYSICAL SPECIFICATIONS Version 1.1" and the DVD-R standard statement "DVD Specifications for Recordable Disc for General (DVD-R for General) Part 1 PHYSICAL SPECIFICATIONS Version 2.0", as a method of OPC, a β method of using a β value having correlation with respect to an asymmetry value and a γ method of using a γ value having correlation with respect to a signal amplification (modulation) of a reproduced signal.

First, the β method will be explained as follows. FIG. 1 is a graph in which X-axis is defined by time and Y-axis is defined by output of signal, and by which the definition of the asymmetry value is explained. FIG. 2 is a graph in which X-axis is defined by time and Y-axis is defined by output of signal from which DC (direct current) component is removed, and by which the definition of the β value is explained. FIG. 3 is a graph in which X-axis is defined by a recording power and Y-axis is defined by an asymmetry value and a jitter value, and by which correlation among the recording power, the asymmetry value, and the jitter are shown.

After a relatively long period signal such as 11T single signal is recorded onto an optical disc, in which a longer mark (amorphous area) having a length which is eleventh times (11T) longer than a channel clock period T and a longer space (crystallized area) having a length of 11T are alternatively repeated, a relatively short period signal such as 3T single signal is recorded, which includes a shorter mark having 3T length and a shorter space having a 3T length, and these signals are reproduced. As a result, the output waveform is measured as shown in FIG. 1. A value of the output signal corresponding to the above-mentioned longer space is defined by V1, a value of the output signal corresponding to the above-mentioned longer mark is defined by V2, a value of the output signal corresponding to the above-mentioned shorter space is defined by V3, a value of the output signal corresponding to the above-mentioned shorter mark is defined by V4. Then, the value of V1 becomes greater than the value of V3, and the value of V2 becomes less than the value of V4. That is why the longer space becomes lighter than the shorter space and the longer mark becomes darker than the shorter mark, when a reproducing laser light is irradiated thereon. And, an asymmetry value A is defined by following equation 1. As shown by the equation 1, the asymmetrical value A is a value obtained by normalizing difference between the center of amplitude of the long period signal (11T single signal) and the center of amplitude of the short period signal (3T single signal).

$$A=\{(V1+V2)-(V3+V4)\}/\{2\times(V1-V2)\} \qquad \text{[Equation 1]}$$

Further, the β value is an asymmetry value to be easily calculated based on a signal obtained by removing the DC (direct current) component from the above-mentioned output signal. Its content is as same as that of the asymmetrical value to be defined by the equation 1. The β value can be obtained according to following procedures. Namely, in the optical information recording device (drive), a DC component is removed from the output signal shown in FIG. 1 to generate an AC signal. The output waveform is shown in FIG. 2. Then, if a value of the output signal corresponding to a longer space at the AC signal is defined by V5, a value of the output signal corresponding to a longer mark is defined by V6, the β value is defined by following equation 2.

$$\beta=(V5+V6)/\{2\times(V5-V6)\} \qquad \text{[Equation 2]}$$

Here, an average value of the output signals shown in FIG. 1 is adopted as 0 level of the AC signal shown in FIG. 2. A practical output signal includes many short-period-components, so that the 0 level of the AC signal becomes substantially equal to the center of the amplitude of the short period signal. Accordingly, as represented by the equation 2, only output signal values V5 and V6 of signals, each whose period is long, are used in order to calculate the β value. However, information of the short period signal is included in the value of 0 level, so that the β value can be used as an asymmetry value. And, in a practical optical information recording device, a signal from which a DC component is removed, is often handled in order to ease amplification of signal using an amplifier. It takes more time to complete the calculation of the equation 1 than the calculation of the equation 2. Therefore, in the optical information recording device, the β value is often used as the asymmetry value.

And, as shown in FIG. 3, the asymmetry value (the β value) is dependent on a recording power. The higher the recording power is, the greater the asymmetry value becomes. Hereinafter, this reason will be explained. The greater the recording power is, the bigger a mark (amorphous portion) to be formed on the optical disc becomes. This mark becomes dark, so that corresponding output signal is lowered. The lowering of the output signal becomes more outstanding, as the mark becomes shorter. Accordingly, the output signal having a shorter mark is largely lowered in accompanying with the increase of the recording power. On the other hand, the output signal of the longer mark is not lowered so much. Thus, the more the recording power increases, the bigger difference between the output signal of the relatively shorter mark and the output signal of the relatively longer mark becomes, so that the asymmetry value will be increased.

In this way, the β method is a method of adjusting the recording power, using the characteristic that the asymmetry value has a recording power dependency. Namely, as shown in FIG. 3, the jitter value is dependent on the recording power, and there exists a recording power whose jitter value becomes minimum, i.e. an optimum laser power P1. However, the jitter value is a static amount, so that it is difficult to measure the value for a short time. Therefore, an asymmetry value A1 at a recording power P1 whose jitter value becomes minimum is beforehand measured, and the value A1 is set as an asymmetry value of a target. And, on the occasion of recording, by searching the recording power so as to obtain an asymmetry value A1 of the target, the recording power is adjusted. In this way, in order to perform OPC using the asymmetry value (the β value) by the β method, in view of its principle, it is necessary that the asymmetry value has a recording power dependency to some extent.

Next, the γ method will be briefly explained. The γ method is a method in which a signal amplitude of a reproduced signal is differentiated by a recording power, the γ value is obtained which is normalized by the magnitude of the signal amplitude, and the recording power that the γ value which becomes 1.5 is thereafter multiplied by 1.22, so that an optimum power is obtained.

Generally, the β method in which relation between the longer mark and the shorter mark is monitored, is more reliable than the γ method in which only signal amplitude is monitored. Further, in the γ method, the above-mentioned coefficients 1.5 and 1.22 are mere recommended values. Depending on an optical head and a medium, any other values may be desirable. Therefore, generally, the γ method is hard to use, i.e. this method is not used so actively.

However, in the above conventional arts, there is a following problem. Recently, a DVD−RW and a DVD+RW in which a phase change recording layer is used, have been able to be applied to high-speed recording. A medium whose range of applicable recording speed (cover range) is widely adopted, i.e. a medium which can record information not only at a specific speed but also at a speed which is higher than the specific speed is realized. Specifically, a medium is realized in which both recording at such a specific speed (1×-speed Write Strategy) and recording at a speed being twice as rapid as the specific speed (2×-speed Write Strategy) can be carried out.

However, the present inventors have found out that if recording is carried out at a relatively low speed with respect to the medium corresponding to high-speed recording in case of the phase change recording layer, an asymmetry value will not be dependent on the recording power. This reason is assumed as follows. It is necessary that a recorded information can be erased by irradiation of laser light for a shorter time than on the occasion of low-speed recording in order to enable high-speed recording by a phase change type medium. Therefore, the phase change recording layer needs to be easy to be crystallized. However, as a result, if recording is carried out by irradiating a laser light onto the phase change recording layer with a relatively greater recording power for a relatively long time on the occasion of low-speed recording, the mark which has been at once amorphous will be re-crystallized by remaining heat from the periphery of the heat, so that the mark will become less. Therefore, even if the recording power is increased, the mark will not become so large, so that the recording power dependency of a signal level corresponding to the mark becomes small. As a result, the recording power dependency of the asymmetrical value will become small.

Thus, the recording power dependency of the asymmetry value becomes small on the occasion of the low-speed recording, whereby the β method can be used on the occasion of high-speed recording, but the β method is not available on the occasion of low-speed recording using the same medium. For example, this causes following problems. If a recording power adjusting device employing the β method as OPC is mounted to a drive only corresponding to 1×-speed recording and thereafter this drive is on sale, there is no problem when a medium only corresponding to 1×-speed recording is used by the drive. However, thereafter, for example, in a case where a medium corresponding to both 1×-speed recording and 2×-speed recording appears, if such a novel medium is used by the above-mentioned drive only corresponding to 1×-speed recording, the drive can perform recording at only 1×-speed, so that the β method which cannot be used at 1×-speed recording is available for OPC to perform 1×-speed recording. This means that the drive erroneously learns the optimum recording power, resulting in that a normal recording will not be possible. Needless to say, such a situation should be avoided absolutely.

SUMMARY OF THE INVENTION

An object of the present invention is to provide a information recording medium, a method of generating the flag, a method of producing a information recording medium, a method of adjusting a recoding condition of the information recording medium, a method of recoding for the information recording medium, and an information recording device, by which information can be properly recorded irrespective of a recording speed, without the information recording device's erroneous learning of an optimum recording power, when information is recorded into a medium corresponding to a high-speed recording.

An information recording medium according to the present invention is recorded information relating to adjustment of the recording conditions and is based on a comparison result between asymmetry values which are obtained from signal recorded in the information recording medium under at least two or more recording conditions, as a readable information at a predetermined position of the information recording medium.

In the present invention, because the information relating to adjustment of the recording conditions is recorded at the predetermined position of the information recording medium, there is no failure of adjustment of the recording conditions when information is recorded onto the information recording medium.

Another information recording medium according to the present invention, the information recording medium on which information is recorded by means of irradiation with light is characterized in that a flag indicating whether or not an intensity of light for recording can be adjusted on the basis of a correlation between an asymmetry value and the intensity of light for recording on the occasion of recording of information is recorded.

In the present invention, the flag is recorded on the information recording medium, so that when the information recording device adjusts the intensity of light for recording, it can be appropriately judged whether or not this adjustment should be carried out on the basis of the correlation between the asymmetry value and the intensity of light for recording. Therefore, it can be prevented that this adjustment may be carried out when the intensity of light for recording cannot be adjusted on the basis of the correlation between the asymmetry value and the intensity of light for recording and it can be thus prevented that the information recording device erroneously learns the optimum recording power. As a result, information can be properly recorded onto the information recording medium irrespective of the recording speed.

Further, it is preferable that the flag indicates that the adjustment is possible if a difference between an asymmetry value of a signal recorded by light at one intensity and an asymmetry value of a signal recorded by light at the other intensity is equal to or greater than a reference value, and on the other hand, the flag indicates that the adjustment is impossible if the difference is less than the reference value. Thereby, magnitude of dependency on the recording power of the asymmetrical value can be readily evaluated.

Further, it is preferable that the reference value is 0.05, and additionally it is preferable that the one intensity corresponds to an intensity at which jitter of signal recorded by means of light at the one intensity is minimum, and the other intensity is 0.85 times as high as the one intensity. Thereby, the flag can be exactly set.

Furthermore, the information recording medium according to the present invention may be an information recording medium, wherein information can be recorded at a plurality of levels of recording speeds, and the flag is set for the case where information is to be recorded at at least one level of recording speed. And, the information recording medium according to the present invention may be an information recording medium, wherein the plurality of levels of recording speeds include one recording speed and a double recording speed that is twice higher than the one recording speed, and the flag is set for at least the one recording speed and the double recording speed. Additionally, the information recording medium relating to the present invention may be a DVD–RW.

A method of generating a flag according to the present invention comprises the steps of: measuring a first asymmetry value at a first recording power at which a jitter becomes minimum; measuring a second asymmetry value at a second recording power which is obtained by multiplication of the first recording power by a coefficient of 0.85; and generating a flag indicating whether or not the asymmetry value is available for OPC by using the first asymmetry value and the second asymmetry value.

Further, in the step of generating the flag of the method of generating a flag, a flag indicating that the asymmetry value is available for OPC may be generated when a difference between the first asymmetry value and the second asymmetry value is 0.05 or more and a flag indicating that the asymmetry value is not available for OPC may be generated when a difference between the first asymmetry value and the second asymmetry value is less than 0.05.

A method of producing an information recording medium on which information is recorded by means of irradiation with light comprises the steps of: producing a confirming recording medium which to measure asymmetry values and confirm whether or not an intensity of light for recording can be adjusted on the basis of a correlation between an asymmetry value and the intensity of light for recording, when the information is recorded; confirming whether or not the intensity of light for recording can be adjusted on the basis of a correlation between the asymmetry value and the intensity of light for recording on the occasion of recording of information by using the confirming recording medium; and producing an information recording medium on which a flag indicating the confirmation result is recorded.

A first aspect of method of adjusting recoding conditions of an information recording medium comprises the steps of: comparing asymmetry values, which are obtained by a signal recorded in the information recording medium, under at least two or more recording conditions; and deciding an adjusting method of recording conditions on the basis of the comparison result.

A second aspect of method of adjusting recording conditions of an information recording medium comprises the steps of: measuring a first asymmetry value at a first recording power at which a jitter becomes minimum; measuring a second asymmetry value at a second recording power obtained by multiplication of the first recording power by a coefficient of 0.85; measuring a difference between the first asymmetry value and the second asymmetry value; and determining that if a difference between the first asymmetry value and the second asymmetry value is 0.05 or more, the asymmetry value is available for OPC while if a difference between the first asymmetry value and the second asymmetry value is less than 0.05, the asymmetry value is not available for OPC.

A third aspect of method of adjusting recording conditions of an information recoding medium comprises the steps of: measuring a first asymmetry value at a first recording power at which a jitter becomes minimum; measuring a second asymmetry value at a second recording power obtained by multiplication of the first recording power by a coefficient of 0.85; generating a flag indicating whether or not an asymmetry value is available for OPC by using the first asymmetry value and the second asymmetry value; and adjusting recording conditions based on the generated flag.

A method of recording for an information recording medium on which information is recorded by means of irradiation with light, and a flag indicating whether or not an intensity of light for recording can be adjusted on the basis of a correlation between an asymmetry value and the intensity of light for recording on the occasion of recording of the information is recorded, comprises the steps of: reading out the flag from the information recording medium, and if the flag indicates that the adjustment is possible, the adjustment based on the correlation is carried out for the intensity of light for recording, and if the flag indicates that the adjustment is impossible, the adjustment based on the correlation is not carried out for the intensity of light for recording; and recording information by irradiating the information recording medium with the light for recording.

In the present invention, the flag is recorded on the information recording medium. When the information recording device adjusts the intensity of light for recording, it can be exactly judged whether or not adjustment of light should be carried out based on the correlation between the asymmetry value and the intensity of light for recording. Thereby, it can be prevented that even when the information recording device cannot adjust the intensity of light for recording on the basis of the correlation between the asymmetry value and the intensity of light for recording, the adjustment is carried out and the optimum recording power is erroneously learned. As a result, information can be properly recorded onto the information recording medium irrespective of the recording speed.

Further, in the adjustment step, it is preferable that when the flag indicates that the adjustment is impossible, the intensity of light for recording is adjusted on the basis of an amplitude of the reproduced signal of information recorded on the information recording medium. Thereby, the information recording device can carry out adjustment on the basis of the amplitude of the reproduced signal, even when the device cannot adjust the intensity of light for recording on the basis of the correlation between the asymmetry value and the intensity of light for recording. As a result, it can be prevented that the intensity of light for recording is largely shifted off the optimum value.

Further, in the method of recording for the information recording medium according to the present invention, the asymmetry value when the jitter becomes minimum is recorded on the information recording medium, and the adjustment of intensity of light for recording based on the correlation between the asymmetry value and the intensity of light for recording may be adjustment of the intensity of light for recording so that the asymmetry value becomes the asymmetry value when the jitter value becomes a minimum value.

Further, the adjustment of the intensity of light for recording based on the correlation between the asymmetry value and the intensity of light for recording may be adjustment of the intensity of light for recording so that the first asymmetry value obtained based on the first period signal and the second period signal having a longer period than that of the first period is identical with the second asymmetry value obtained based on the third period signal and the fourth period signal having a longer period than that of the third period signal.

An information recording device according to the present invention for recording information on an information recording medium by irradiating the information recording medium with light, wherein a flag is recorded on the information recording medium, the flag indicating whether or not an intensity of light for recording can be adjusted on the basis of a correlation between an asymmetry value and the intensity of light for recording on the occasion of recording of the information on the medium, comprises: a reading section for reading out the flag from the information recording medium; an adjustment section for adjusting the intensity of light for recording on the basis of the correlation between an asymmetry value of the information recording medium and the intensity of light for recording; a selecting section for activating the adjustment section when the flag having been read out by the reading section indicates that the adjustment is possible; and a recording section for recording information on the information recording medium by irradiating the information recording medium with the light for recording.

In the present invention, the reading section reads a flag recorded on the information recording medium, the selecting section selects a method of adjusting the intensity of light for recording, and the adjustment section adjusts the intensity of light for recording on the basis of the selection, so that information can be recorded in a splendid state with respective to the information recording medium on which the flag is recorded.

Another information recording device according to the present invention for recording information on an information recording medium by irradiating an information recording medium with light, comprises: an adjustment section for adjusting the intensity of light for recording on the basis of a correlation between an asymmetry value of the information recording medium and an intensity of light for recording; a signal recording section for recording one signal on the information recording medium by means of light at one intensity, while recording the other signal on the information recording medium by means of light at the other intensity; a selecting section for determining an asymmetry value of the one signal and an asymmetry value of the other signal and calculating a difference between the asymmetry values, and for activating the adjustment section when the difference is equal to or greater than a reference value; and a recording section for recording information on the information recording medium by irradiating the information recording medium with light.

In the present invention, the signal recording section records a predetermined signal for the information recording medium and the selecting section measures the asymmetry value based on the predetermined signal. Thereby, the method of adjusting the intensity of light for recording is selected, and the adjustment section adjusts the intensity of light for recording on the basis of the selection, so that information can be recorded in a splendid state even for an information recording medium on which a flag is not recorded.

As above-explained in detail, according to the present invention, a flag indicating whether or not the method using the asymmetry value is available for OPC for an information recording medium. Thereby, the information recording device can exactly and stably adjust the recording conditions, so that quality of the recording signal can be extraordinarily enhanced. This effect is equivalent to that reliability of the information recording medium, and the information recording device can be extraordinarily enhanced. As a result, such a technology greatly contributes to improvement of an optical disc industry.

BRIEF DESCRIPTION OF THE DRAWINGS

FIG. 5A shows a measured result on the occasion of 1×-speed recording and FIG. 5B shows a measured result on the occasion of 2×-speed recording.

FIG. 6A shows a measured result on the occasion of 1×-speed recording and FIG. 6B shows a measured result on the occasion of 2×-speed recording.

FIG. 9 is a block diagram showing a DVD drive relating to a sixth embodiment of the present invention.

FIG. 10A shows a case on the occasion of 1×-speed recording and FIG. 10B shows a case on the occasion of 2×-speed recording.

FIG. 11A shows a case on the occasion of 1×-speed recording, and FIG. 11B shows a case on the occasion of 2×-speed recording.

DETAILED DESCRIPTION OF THE PREFERRED EMBODIMENTS

The embodiments of the present invention will be specifically explained, referring to the attached drawings.

Figure 4:
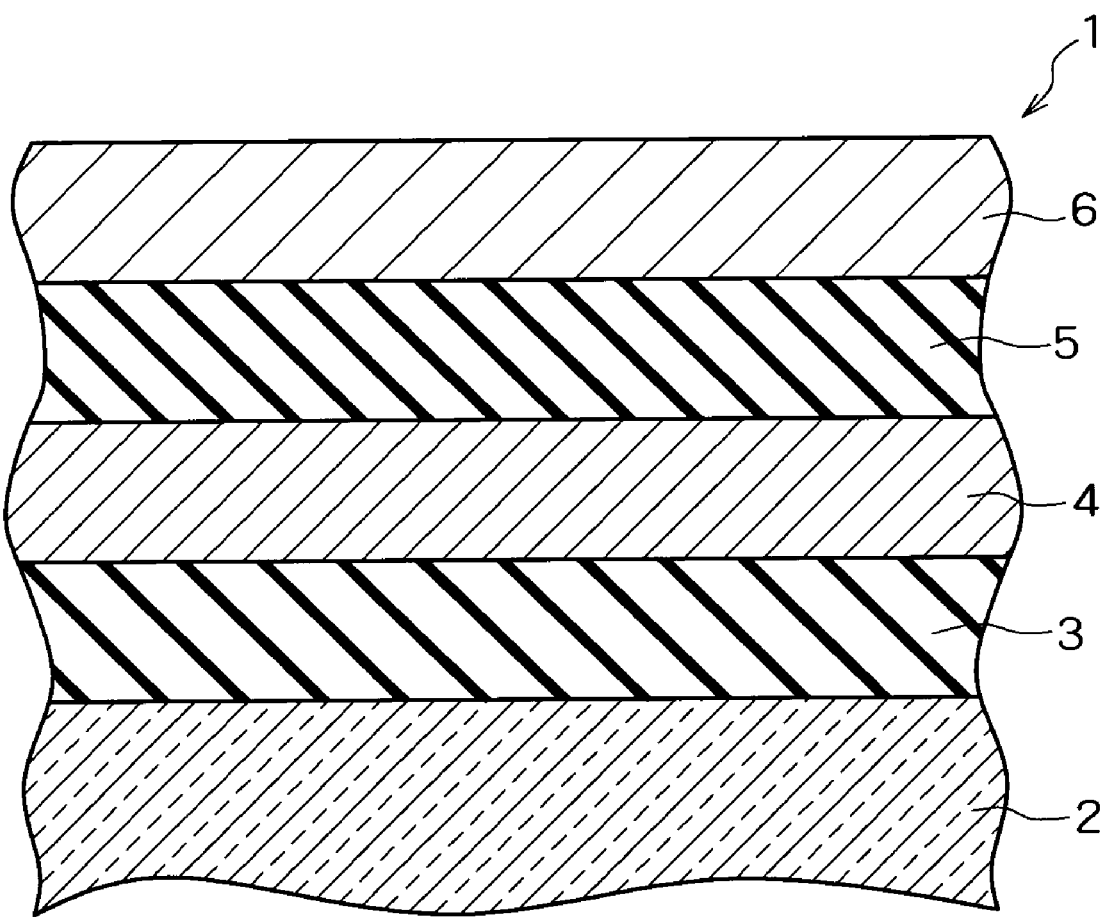
FIG. 4 is a sectional view showing a DVD–RW which is an information recording medium relating to a first embodiment of the present invention.

First, a first embodiment of the present invention will be described. FIG. 4 is a sectional view showing a DVD-RW of an information recording medium relating to the present embodiment. The DVD-RW relating to the present embodiment is an optical disc which is rewritable and phase change recording typed corresponding to both 1×-speed recording and 2×-speed recording.

As shown in FIG. 4, a DVD-RW1 relating to the present embodiment is provided with a disc-shaped transparent substrate 2 e.g. made of polycarbonate whose thickness is 0.6 mm and whose diameter is 12 cm. At a surface of the substrate 2, a guide groove (not shown) called "pre-groove" is formed. On the occasion of recording and reproducing, an information recording device, i.e., an optical head of a DVD drive can scan the disc along the guide groove. On the substrate 2, a dielectric layer 3 made of ZnS—SiO$_2$, a phase change recording layer 4 made of AgInSbTe, a dielectric layer 5 made of ZnS—SiO$_2$, and a reflection layer 6 made of AlTi are stacked in this order. The dielectric layers 3 and 5 protect the phase change recording layer 4, and further control an interference condition of the laser light to obtain a greater signal. A phase state of the phase change recording layer 4 is in a crystal state at its initial stage. By irradiating a laser light for recording on the layer 4 so that the crystal state is changed into an amorphous state, resulting in that information is recorded. The reflection layer 6 is for reflecting the laser light which has passed through the substrate 2, the dielectric layer 3, the phase change recording layer 4, and the dielectric layer 5 toward the phase change recording layer 4. It is noted that a protection layer may be provided which is made of ultra-violet hardening resin or the like on the reflection layer 6.

Further, LPP (Land Pre-Pit) represented in the specification of the DVD-RW is formed on the surface of the substrate 2 of the DVD-RW1. LPP is meant by that a pre-pit is arranged at a lateral side of the guide groove, and expresses a bit of "0" or "1" according to the arrangement way. The unit of LPP is constituted by a Pre-Pit data frame of 12 bits totally consisting of 4-bit relative address and 8-bit information for each relative address. This Pre-Pit data frame is incorporated by the number of sixteen frames to constitute a Pre-Pit block. Conventionally, there have been five kinds of Pre-Pit blocks according to category of information interleaved within the block, which have been named "Field. ID1" to "Field ID5". In the DVD-RW1 relating to the present invention, "Field. ID6" is set as a sixth Pre-Pit block in addition to "Field. ID1" to "Field. ID5". In lower 4-bits of the pre-bit data frame which is the twelfth relative address at the "Field. ID6", a flag is recorded for representing whether or not the asymmetry value is available for OPC in case of 2×-speed recording. In upper 4-bits of the pre-bit data frame which is the twelfth relative address, a flag is recorded for representing whether or not the asymmetry value is available for OPC in case of 1×-speed recording, and when these flags are directed to "0000b", the asymmetry value is available for OPC means. For example, when these flags are directed to "0001b", the asymmetry value is not available for OPC means. It is noted that information of the optimum recording power P1 of the DVD-RW1 and the asymmetry value A1 (see FIG. 3) corresponding to an optimum recording power P1 is also recorded.

Figure 3:
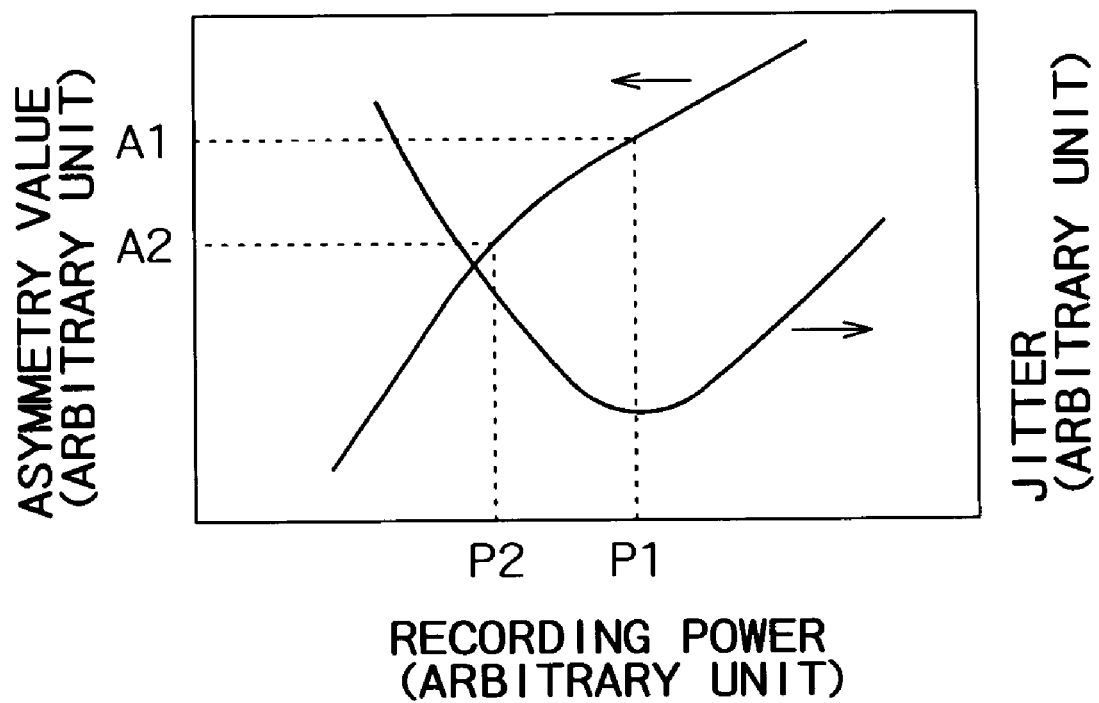
FIG. 3 is a graph for indicating a correlation among a recording power, an asymmetry value, and a jitter value, in which X-axis is defined by the recording power and Y-axis is defined by the asymmetry value and the jitter value.

Next, a method of setting the flag will be described. As shown in FIG. 3, as to the DVD-RW, there is a constant correlation between a jitter value and a recording power. There exists a recording power P1 such that the jitter value becomes minimum. This recording power P1 is an optimum recording power.

Figure 2:
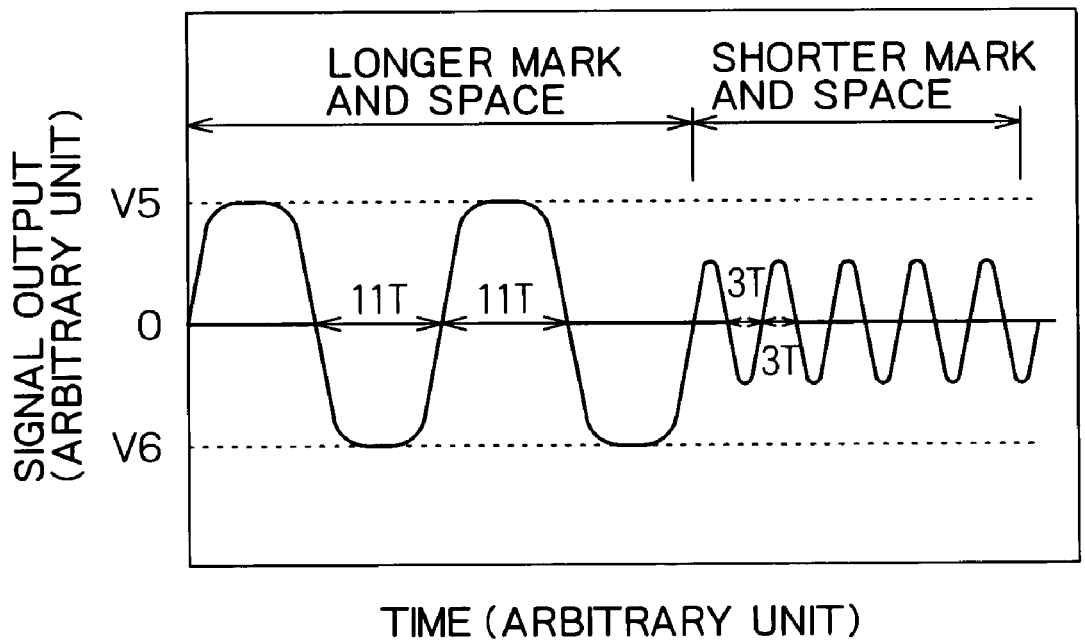
FIG. 2 is a graph for explaining about a definition of β value, in which X-axis is defined by time and Y-axis is defined by output of signal from which DC component is removed.

First, two kinds of signals whose periods are mutually different, e.g. 11T single signal and 3T single signal are recorded onto DVD-RW1. Then, as shown in FIG. 3, a signal is recorded with a recording power P1 such that the jitter value becomes minimum and a recording power P2 having intensity of 85% with relative to the recording power P1. Then, when these signals are reproduced, an output waveform is obtained as shown in FIG. 2. Next, an asymmetry value is calculated according to the above-mentioned equation 1. As a result, as shown in FIG. 3, the asymmetry value A1 of a signal recorded with the recording power P1 and the asymmetry value A2 of a signal recorded with the recording power P2 are obtained. Next, a difference between the asymmetry values A1 and A2; (A1-A2) is obtained. It is noted that the asymmetry value is monotonously increased with relative to the recording power, so that the value of (A1-A2) becomes positive. Next, the value of (A1-A2) is compared with a reference value. The reference value is e.g. 0.05. If the value of (A1-A2) is equal to or more than the reference value, it is judged that the asymmetry value is available for OPC, because the recording power dependency of the asymmetry value is sufficiently large, "0000b" is recorded as the above-mentioned flag. On the other hand, the value of (A1-A2) is less than the reference value, it is judged that the asymmetry value is not available for OPC, because the recording power dependency of the asymmetry value is insufficiently large, "0001b" is recorded as the above-mentioned flag.

It is noted that in the present embodiment, 11T single signal and 3T single signal are used as signals for measuring the asymmetry value, but the signals for measuring the asymmetry value are not always limited to them. As to a long period signal, a long period signal substantially as long as 11T single signal has only to be used, namely, the long period signal is not limited to 11T single signal. It is noted that as to a short period signal, a single signal whose length is also length except for 3T can be used. However, 3T single signal is most changed dependent on the recording power, so that the recording power can be adjusted most effectively.

Further, the DVD-RW1 relating to the present embodiment, EFMplus is used as a modulation code. It is noted that even when the other code of 1-7 modulation and the like are used, basically, the same principle can be applied thereto. These modulation codes are limited to an upper value and a lower value of length of a mark to be formed.

The reason why the intensity of the recording power P2 is 85% with relative to the optimum recording power P1 and the reference value of the value of (A1-A2) is 0.05, will be explained as follows. Three kinds of mediums (the DVD–RW: medium 1 to medium 3) and three kinds of optical heads (optical head 1 to optical head 3) are prepared, and the value of (A1-A2) is measured for all the combinations of the mediums and the optical heads. First, after OPC is carried out by the β method for these mediums, information recording is carried out, then the result is evaluated. Table 1 shows the evaluation result. As shown in Table 1, as to all the three kinds of mediums, good results can be obtained at OPC by the β method on the occasion of 2×-speed recording, but good results cannot be obtained at OPC by the β method on the occasion of 1×-speed recording. Namely, the β method can be used on the occasion of 2×-speed recording while the β method is not available on the occasion of 1×-speed recording. Namely, this is equivalent to that the asymmetry value is not available for OPC.

TABLE 1

|  | Medium 1 | Medium 2 | Medium 3 |
|---|---|---|---|
| 1×-speed recording | inferior | inferior | Inferior |
| 2×-speed recording | excellent | excellent | Excellent |

Figure 5A:
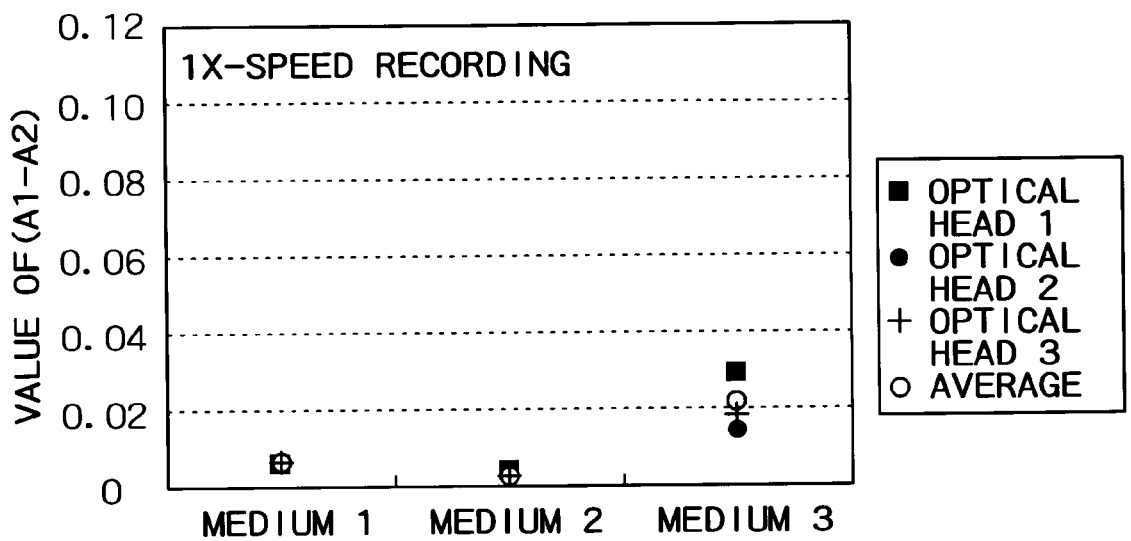
FIG. 5A and FIG. 5B are graphs indicating a value of (A1-A2) in a case where a recording power P2 is set by intensity of 90% with relative to an optimum recording power P1, in which X-axis is defined by kinds of mediums (DVD–RW) and Y-axis is defined by the value of (A1-A2).
Figure 5B:
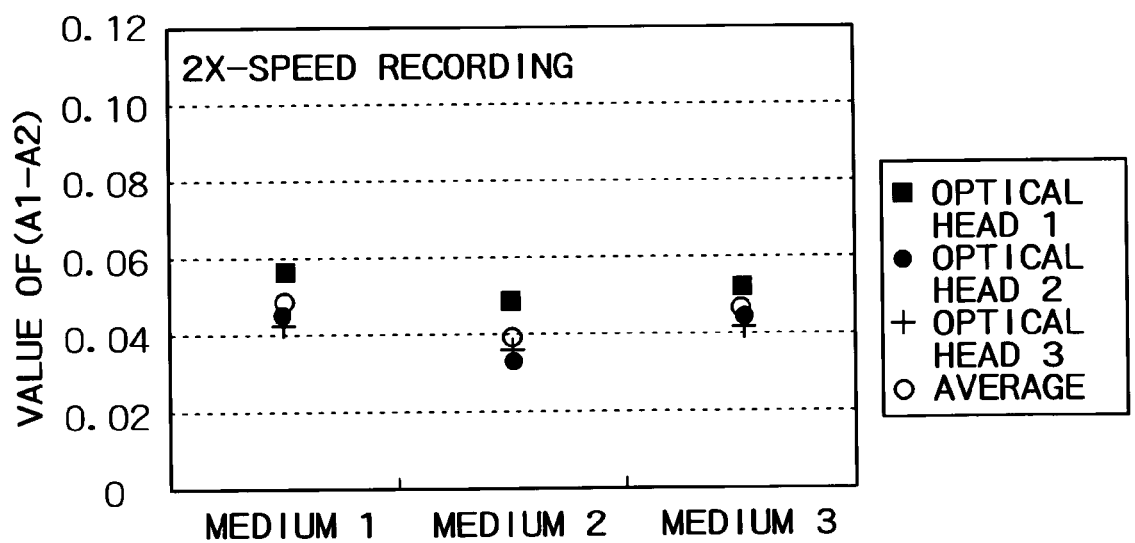
Figure 6A:
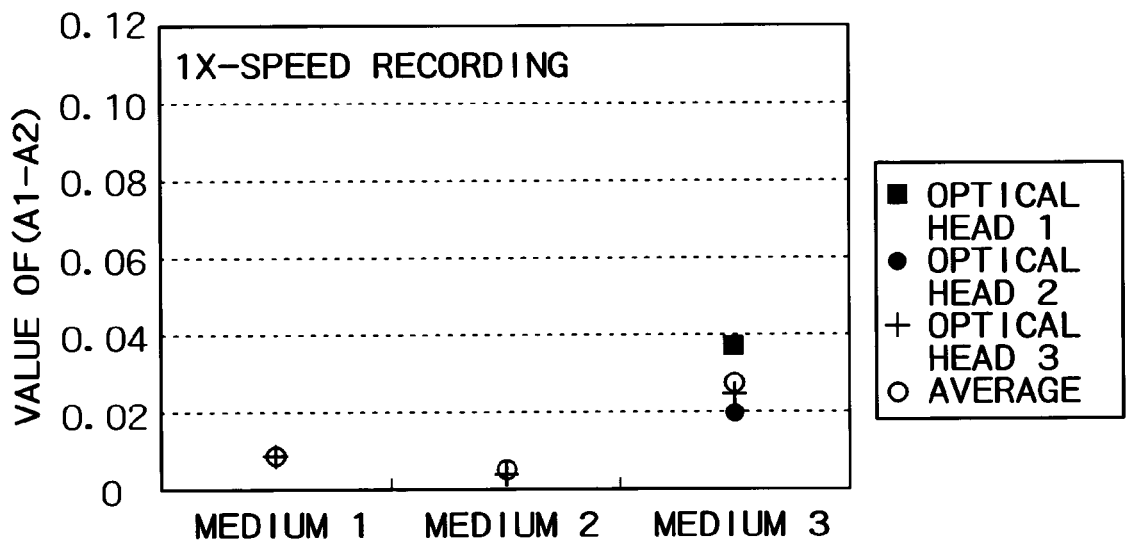
FIG. 6A and FIG. 6B are graphs indicating a value of (A1-A2) in a case where a recording power P2 is set by intensity of 85% with relative to an optimum recording power P1, in which X-axis is defined by kinds of mediums (DVD–RW) and Y-axis is defined by the value of (A1-A2).
Figure 6B:
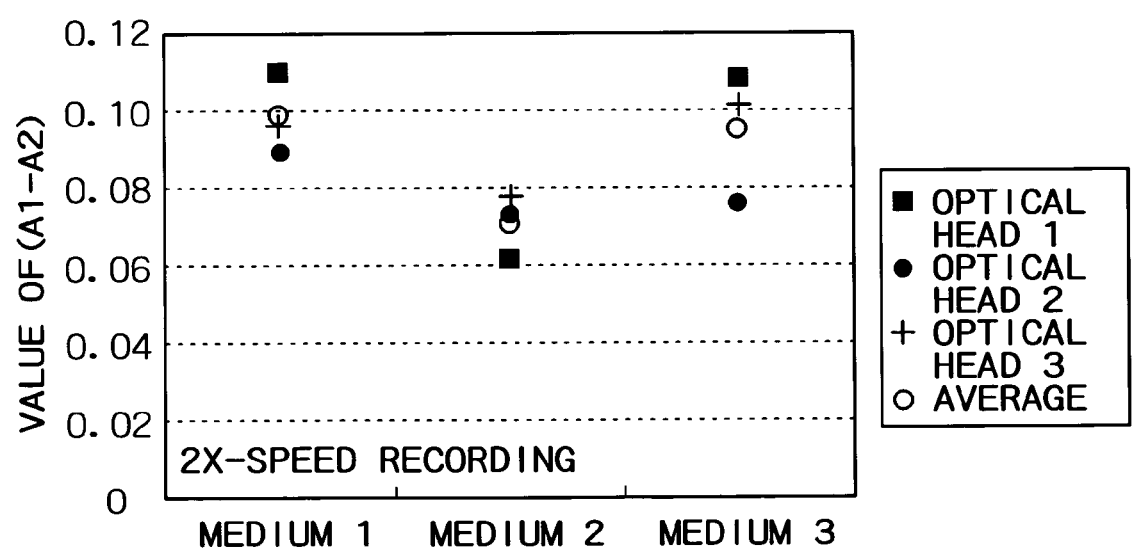

FIG. 5A and FIG. 5B are graphs representing the value of (A1-A2) when the recording power P2 has 90% of intensity with relative to the optimum recording power P1, in which X-axis is defined by kinds of mediums (DVD–RW) and Y-axis is defined by the value of (A1-A2). FIG. 5A shows the measured result on the occasion of 1×-speed recording. FIG. 5B shows the measured result on the occasion of 2×-speed recording. FIG. 6A and FIG. 6B are graphs representing the value of (A1-A2) when the recording power P2 has 85% of intensity with relative to the optimum recording power P1, in which X-axis is defined by kinds of mediums (DVD–RW) and Y-axis is defined by the value of (A1-A2). FIG. 6A shows the measured result on the occasion of 1×-speed recording. FIG. 6B shows the measured result on the occasion of 2×-speed recording. Further, Table 2 shows the value of (A1-A2) on the occasion of 2×-speed recording when the recording power P2 has 80% of intensity with relative to the optimum recording power P1.

As shown in FIG. 5A and FIG. 5B, when the value of the recording power P2 is set to be 90% with relative to the value of the optimum recording power P1, the value of (A1-A2) on the occasion of 1×-speed recording is substantially 0 to 0.03, while the value of (A1-A2) on the occasion of 2×-speed recording is substantially 0.03 to 0.06. In this way, the value of (A1-A2) on the occasion of 2×-speed recording is totally greater than the value of (A1-A2) on the occasion of 1×-speed recording. However, the former value and the latter value are overlapped around the value "0.03", so that a reference value for clearly separating them cannot be decided. Therefore, even when the value of the recording power P2 is set to be 90% with relative to the optimum recording power P1, and the value of (A1-A2) is calculated, it is difficult to uniquely judge whether or not the asymmetry value is available for OPC.

On the other hand, as shown in FIG. 6A and FIG. 6B, when the value of the recording power P2 is 85% with relative to the value of the optimum recording power P1, the value of (A1-A2) on the occasion of 1×-speed recording is substantially 0.003 to 0.04 while the value of (A1-A2) on the occasion of 2×-speed recording is substantially 0.06 to 0.11. In this way, clear difference between the value of (A1-A2) on the occasion of 1×-speed recording and the value of (A1-A2) on the occasion of 2×-speed recording is recognized. If a proper reference value is set, it can be uniquely judged whether or not the asymmetry value is available for OPC based on the value of (A1-A2). Note that in view of dispersion of the measured data, it is desirable that the reference value is 0.05 which is an intermediate value between the maximum value (about 0.04) on the occasion of 1×-speed recording data and the minimum value (about 0.06) on the occasion of 2×-speed recording data. Thereby, it can be judged that if the value of (A1-A2) is 0.05 or more, the asymmetry value is available for OPC while if the value of (A1-A2) is less than 0.05, the asymmetry value is not available for OPC.

TABLE 2

|  | Medium 1 | Medium 2 | Medium 3 |
|---|---|---|---|
| Optical Head 1 | 0.142 | 0.108 | 0.138 |
| Optical Head 2 | unmeasurable | 0.095 | unmesurable |
| Optical Head 3 | 0.121 | 0.097 | 0.117 |

Further, as shown in Table 2, when the value of the recording power P2 is 80% with relative to the optimum recording power P1, there occurs a case where measurement of the value of (A1-A2) becomes impossible on the occasion of 2×-speed recording. That's why if the recording power P2 is reduced by 20% with relative to the optimum recording power P1, the recording power P2 becomes insufficient, the recording in itself cannot be splendidly carried out, resulting in that the measurement of the value of (A1-A2) becomes impossible. Accordingly, even when the value of the recording power P2 is set to be 80% with relative to the value of the optimum recording power P1 to calculate the value of (A1-A2), a case where measurement cannot be carried out occurs, and it cannot be judged whether or not the asymmetry value is available for OPC.

Accordingly, when a flag is set which represents whether or not the asymmetry value is available for OPC, the intensity of the recording power P2 is set to be 85% with relative to the optimum recording power P1, and the reference value of the value of (A1-A2) is preferably set to be 0.05. It is noted that, as above-mentioned explanations, the recording power P2 does not need to be 85% with relative to the recording power P1, absolutely. For example, the recording power P2 may be substantially about 85%. Also, the reference value does not need to be 0.05. Namely, the reference value may be about 0.05.

As above-mentioned, in the present embodiment, the flag indicating whether or not the asymmetry value is available for OPC is recorded at every recording speed on DVD–RW1 being the information recording medium, so that when the DVD drive adjusts the recording power, it can be exactly judged whether or not the asymmetry value should be used. Therefore, it can be prevented that the asymmetry value is used when the asymmetry value cannot be used and the DVD drive erroneously learns the optimum recording power. As a result, information can be properly recorded onto the DVD–RW1 in spite of the recording speed.

Also, in the present embodiment, the asymmetry values A1 and A2 are respectively measured with the optimum recording power P1 and the recording power P2 whose intensity is 85% with relative to the optimum recording power P1. And the value of (A1-A2) is compared with the reference value being 0.05 to set the flag. Thereby, the flag can be exactly set.

Thus, according to the present embodiment, when a medium is completed, the above-mentioned value of (A1-A2)

is measured at a desired recording speed with respect to the medium, this value of (A1-A2) is compared with the reference value being 0.05 and thereafter the compared result is incorporated into the medium. Thus, if the drive reads out the information, it can be judged whether or not OPC using the asymmetry value is operated. Note that there are the above-mentioned β method and below-mentioned multi β method etc. for OPC using the asymmetry value. Thereby, the DVD drive can operate OPC safely without monitoring future medium changing.

Figure 7:
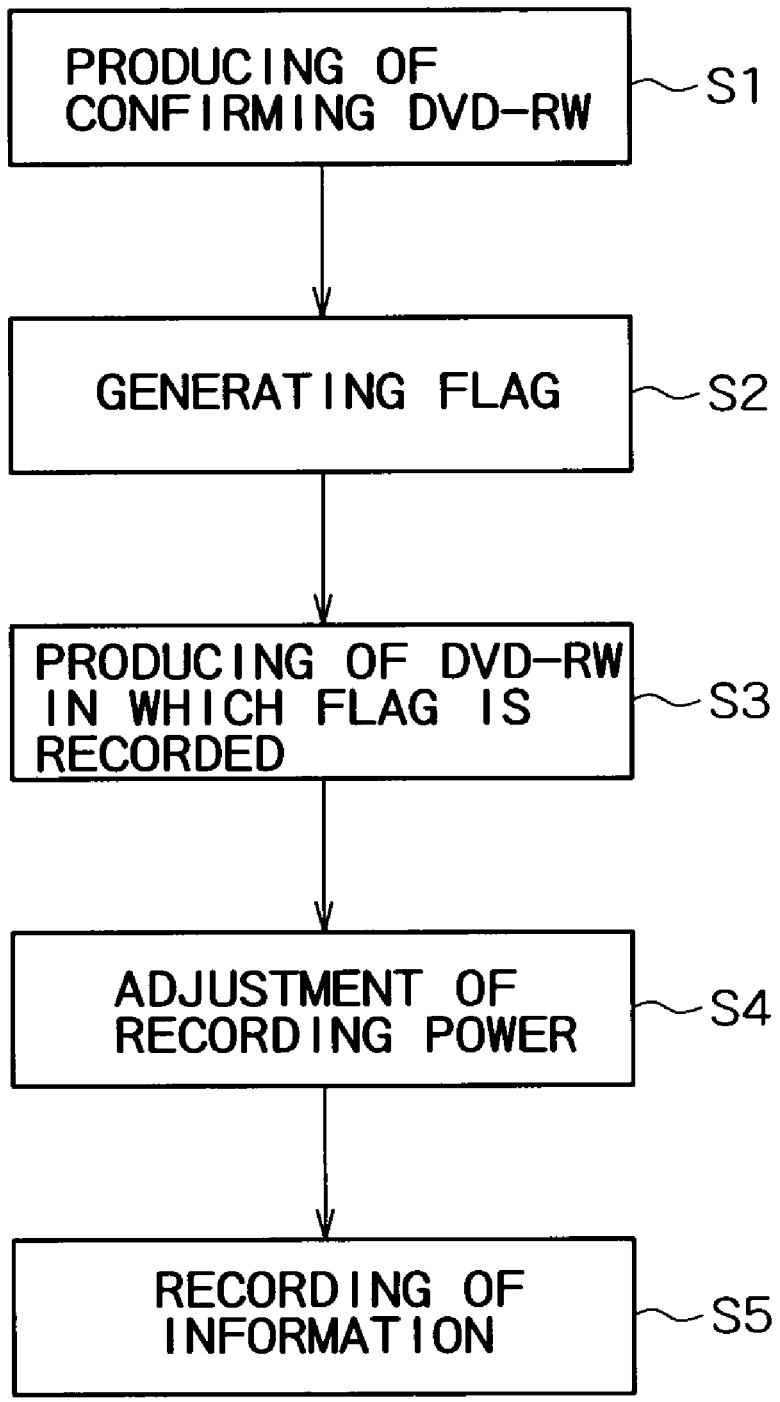
FIG. 7 is a flowchart showing a method of producing a DVD–RW relating to a second embodiment of the present invention and a recording method relating to a fourth embodiment.

Next, a second embodiment of the present invention will be described. The present embodiment relates to a method of producing the DVD-RW1 constituted as above-mentioned relating to the first embodiment. Note that the method of producing the DVD-RW1 includes a method of generating a flag. FIG. 7 is a flowchart indicating the method of producing of the DVD-RW relating to the present embodiment and a method of recording relating to below-mentioned fourth embodiment. Step S1 to Step S3 are directed to the method of producing the DVD-RW relating to the present embodiment, and Step 4 and Step 5 are directed to the method of recording of the DVD-RW relating to the below-mentioned fourth embodiment.

Hereinafter, the method of producing the DVD-RW1 will be described. As shown in Step 1 in FIG. 7, first a confirming DVD-RW for confirming whether or not the method using the asymmetry value is available for OPC. As shown in FIG. 4, a disc-shaped transparent substrate 2 made of polycarbonate whose thickness is e.g. 0.6 mm and whose diameter is 12 cm is prepared. A guide groove called "pre-groove" (not shown) is formed on the surface of the substrate 2. Next, a dielectric layer 3 made of ZnS—SiO$_2$, a phase change recording layer 4 made of AgInSbTe, a dielectric layer 5 made of Zns-SiO$_2$, and a reflection layer 6 made of AlTi are formed and stacked in this order, for example, by sputtering. And, if necessary, a protecting layer made of ultra-violet hardening resin or the like is formed on the reflection layer 6. Thereby, it is confirmed whether or not the asymmetry value is available for OPC, then a confirming DVD-RW for generating the above-mentioned flag on the basis of the confirmation result is produced.

Next, as represented at step S2 in FIG. 7, using the confirming DVD-RW, it is confirmed whether or not the asymmetry value is available for OPC and a flag to be incorporated therein will be decided. First, for example, 11T single signal and 3T single signal are recorded onto the confirming DVD-RW using the optimum recording power P1 and the recording power P2 whose intensity is 85% with relative to the recording power P1. And these signals are reproduced, and asymmetry values (β values) A1 and A2 respectively corresponding to the recording powers P1 and P2 are calculated. And, the value of (A1-A2) is compared with the reference value "0.05". It is judged that if the value of (A1-A2) is equal to or more than the reference value "0.05", the asymmetry value is available for OPC at this recording speed, alternatively, if the value of (A1-A2) is less than 0.05, the asymmetry value is not available for OPC at this recording speed. Note that it is expected that this judgment result may become the same result in a case where recording is carried out at the same speeds with respect to the same kinds of mediums. Therefore, the above-mentioned judgment has only to at least once perform with relative to each of recording speeds with relative to the confirming DVD-RW.

Next, as shown at Step S3 in FIG. 7 and in FIG. 4, based on the above-mentioned judgment result, a DVD-RW1 is produced into which the flag is incorporated. When a substrate is produced, LPP is an emboss signal to be incorporated into this substrate. As a substrate 2, a substrate may be formed so that the flag is recorded into LPP. Namely, if the value of (A1-A2) is equal to or more than the reference value "0.05" and the asymmetry value is available for OPC, "0000b" as a flag is recorded onto a Pre-Pit data frame at a twelfth relative address of Field. ID6 in LPP of DVD-RW1. If the value of (A1-A2) is less than the reference value "0.05" and the asymmetry value is not available for OPC, "0001b" as a flag is recorded onto a Pre-Pit data frame at a twelfth relative address of Field. ID6 in LPP of DVD-RW1. Further, information relating to an optimum recording power P1 and an asymmetry value A1 corresponding to the power P1 are also recorded in LPP. Thereafter, the dielectric layer 3, the phase change recording layer 4, the dielectric layer 5, and the reflection layer 6 are formed in this order as shown in FIG. 4. These steps are substantially as same as the steps for producing the above-mentioned confirming DVD-RW. Thereby, the above-mentioned DVD-RW1 relating to the first embodiment is produced.

In the present embodiment, the above-mentioned DVD-RW relating to the first embodiment can be efficiently produced as above. Additionally, reliability can be enhanced when information is recorded, because the flag is recorded on this DVD-RW.

Figure 8:
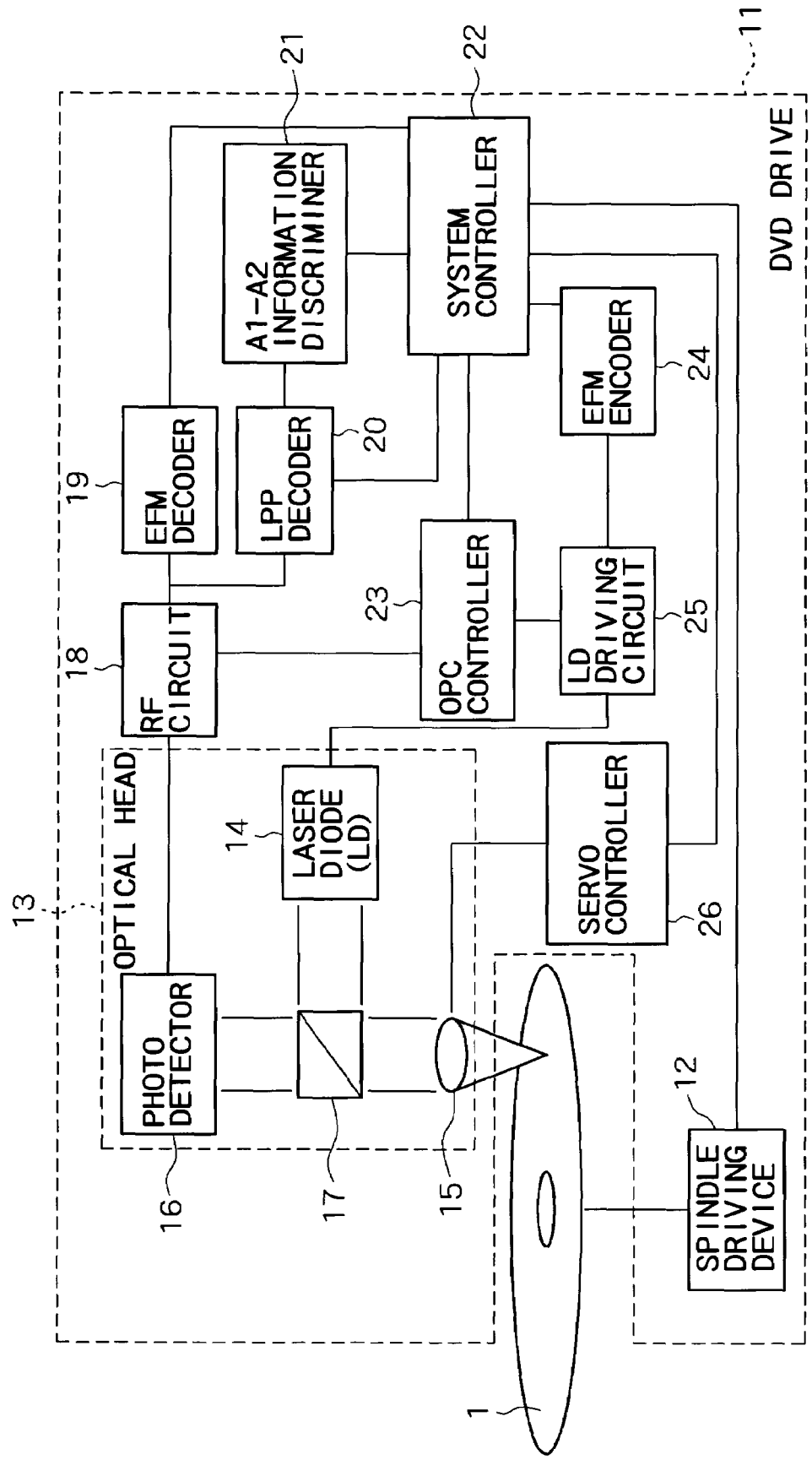
FIG. 8 is a block diagram showing a DVD drive relating to a third embodiment of the present invention.

Next, a third embodiment of the present invention will be described. This embodiment is an embodiment for an information recording device for recording information on the DVD-RW relating to the first embodiment described above. This information recording device is a DVD drive for performing recording, reproducing and erasing of the information for the DVD-RW 1 that is an information recording medium according to the embodiments as above-mentioned. FIG. 8 is a block diagram showing the DVD drive of the present embodiment. As shown in FIG. 8, a DVD drive 11 in the present embodiment is provided with a spindle driving device 12 for rotating the DVD-RW 1, and is provided with an optical head 13 for irradiating the DVD-RW 1 with a laser light and detecting the laser light reflected from the DVD-RW 1.

The optical head 13 is provided with a laser diode (LD) 14 for emitting a laser light, and is provided with an object lens 15 for condensing the laser light emitted from the LD 14 onto the DVD-RW 1 and collimating the laser light reflected from the DVD-RW 1. The optical head 13 is also provided with an photo detector 16 for detecting the laser light from the DVD-RW 1. Furthermore, in an optical path of the laser beam emitted from the LD 14, there is provided a beam splitter 17 for reflecting the laser light emitted form the LD 14 toward the object lens 15 and for transmitting therethrough the laser light reflected from the DVD-RW 1 toward the photo detector 16 in an optical path of the laser light emitted from the LD 14.

In the standard specification of DVD-R/RW, there is description about a recording optical head in which a rim intensity is set to be somewhat lower in order to obtain a larger recording power; and a reproducing optical head in which a rim intensity is set to be somewhat higher and a beam is more focused in order to confirm compatibility to a DVD-ROM (DVD-Read Only Memory). And, typically, the recording optical head is mounted to the DVD drive. On the other hand, the reproducing optical head is mounted to a testing device for confirming a quality of a signal to be recorded by the recording optical head.

In the part other than the optical head 13 in the DVD drive 11, there is provided an RF circuit 18. The RF circuit 18 is arranged to receive an output signal of the photo detector 16 and discriminates between data information and an LPP signal from among this output signal. In addition, there are provided an EFM decoder 19 having input of the data information outputted from the RF circuit 18 and decoding the data information, and an LPP decoder 20 for decoding the LPP signal outputted from the RF circuit 18. A reading section is constituted by the optical head 13, the RF circuit 18 and the LPP decoder 20. Moreover, there is provided an A1-A2 information determiner 21 as a selecting section which receives an output signal of the LPP decoder 20, and which recognizes a flag generated based on a difference (A1-A2) between asymmetry values to determine whether or not the asymmetry value is available when performing the OPC, then selects a method of performing the OPC.

There is also provided a system controller 22, which receives the output signals of the LPP decoder 20 and the A1-A2 information determiner 21, and which controls operation of the whole of the DVD drive 11. There is further provided an OPC controller 23, which receives the output signals of the system controller 22 and the RF circuit 18, and which curries out the OPC on the occasion of recording information on the DVD-RW1. The OPC controller 23 is an adjustment section for adjusting a recording power by realizing the β method and the γ method as the OPC, which calculates the β value and the γ value and feeds back the learned results obtained by realizing the β method and the γ method to the system controller 22.

Furthermore, there is provided an EFM encoder 24, which is connected to the system controller 22 and encodes data information to be recorded on the DVD-RW 1. There is also provided an LD driving circuit 25 for driving the LD 14 on the basis of an output signal of the OPC controller 23 and an output signal of the EFM encoder 24. A recording section is constituted by the EFM encoder 24 and the LD driving circuit 25. Besides, there is provided a servo controller 26 for controlling a position of the optical head 13 on the basis of an output signal of the system controller 22.

Next, the fourth embodiment of the present invention will be described. This embodiment corresponds to a method of recording information on the DVD-RW 1 according to the first embodiment as above-mentioned, or an implementation of operation of the DVD drive 11 according to the third embodiment as above-mentioned. Note that the method of recording information relating to the present embodiment includes a method of adjusting recording conditions. As shown at the step S4 in FIG. 7 and in FIG. 8, the recording conditions for the DVD-RW 1 are adjusted at first. Namely, the system controller 22 of the DVD drive 11 causes the spindle driving device 12 to be activated to rotate the DVD-RW 1. Next, the system controller 22 causes the servo controller 26 to be driven to locate the optical head 13 at a position where the flag can be read out from the DVD-RW 1. Then, the LD driving circuit 25 causes the LD 14 to emit a laser light. The laser light is reflected by the beam splitter 17 and converged by the object lens 15 to be condensed onto the DVD-RW 1. The laser light is reflected from the DVD-RW 1 and collimated by the object lens 15, and subsequently it is transmitted through the beam splitter 17 and enters the photo detector 16.

The photo detector 16 converts the inputted laser light into an electric signal and outputs it to the RF circuit 18. The RF circuit 18 discriminates data information and an LPP signal from the electric signal, and outputs the data information to the EFM decoder 19 and at the same time outputs the LPP signal to the LPP decoder 20. At this time, data relating to the flag is inputted to the LPP decoder 20. The LPP decoder 20 decodes information included in the LPP and outputs the decoded information to the system controller 22 and the A1-A2 information determiner 21. In this way, the data relating to the flag are outputted to the A1-A2 information determiner 21.

The A1-A2 information determiner 21 recognizes the flag, and instructs the system controller 22 to carry out the β method for the OPC if the flag indicates "0000b", namely that the method of using the asymmetry value is available for the OPC. On the other hand, it instructs the system controller 22 to carry out the γ method for the OPC if the flag indicates "0001b", namely that the method using the asymmetry value is not available for the OPC.

In dependence on the instruction, the system controller 22 gives a command to the OPC controller 23 to cause the controller 23 to realize either the β method or the γ method. In the case of realizing the β method, the OPC controller 23 gives a command to the LD driving circuit 25 to cause the LD 14 to emit the laser light with the recording power being varied, while it acquires a reproduced signal from the DVD-RW 1 through the photo detector 16 and the RF circuit 18 and performs the calculation represented by the above-mentioned equation 2 to calculate the β value. Then, as shown in FIG. 3, the recording power is adjusted in order for this β value to be a β value A1 in which a jitter is minimum. It is noted that the β value A1 for minimizing the jitter is beforehand stored in the LPP of the DVD-RW. Accordingly, the recording power can be adjusted to be an optimal recording power P1.

After adjusting the recording conditions as mentioned above, the information is recorded on the DVD-RW 1 as shown at the step S5 in FIG. 7. This recording operation will now be described hereinafter. Under the condition of keeping the spindle driving device 12 rotating the DVD-RW 1, the servo controller 26 controls the position of the optical head 13 to locate the optical head at a predetermined position in the DVD-RW 1. Then, the information to be recorded is inputted to the system controller 22. The system controller 22 outputs the information to the EFM encoder 24, and the EFM encoder 24 encodes the information in conformity with a modulation coding system such as EFMplus or the like and outputs the coding results to the LD driving circuit 25. The LD driving circuit 25 drives the LD 14 of the optical head 13 on the basis of the encoded signal to cause the LD 14 to emit the laser light. The laser light emitted from the LD 14 is applied to the DVD-RW 1 through the beam splitter 17 and the object lens 15.

At this moment, as shown in FIG. 4, the laser light enters the DVD-RW 1 from the substrate 2's side of the DVD-RW 1. Then, after the laser light is transmitted through the substrate 2 and the dielectric layer 3, it reaches the phase change recording layer 4 to heat a part of the phase change recording layer 4 at a temperature of the melting point or higher to thereby have the part melted. It is noted that the laser light having been transmitted through the phase change recording layer 4 is transmitted through the dielectric layer 5, subsequently reflected on the reflection layer 6, and again transmitted through the dielectric layer 5 before reaching the phase change recording layer 4. After that, rapid cooling of the phase change recording layer 4 leads to making the part amorphous to form a mark. Thus the information is recorded with the phase change recording layer 4 being made to be amorphous or crystalline.

Next, it will be described the case of reproducing information having been recorded on the DVD-RW 1. The LD 14 of the optical head 13 emits a laser light at a constant output. At this time, the marks on the DVD-RW 1 have a lower optical reflectance because of the amorphous state of the phase change recording layer 4 and the reflected light has a lower intensity. On the other hand, the spaces between the marks have a higher optical reflectance than the marks have, because of the crystalline state of the phase change recording layer 4, and the reflected light has a higher intensity. The photo detector 16 detects such reflected light rays that vary in intensity according to the thus recorded information, and converts them into an electric signal. The RF circuit 18 discriminate the data information and LPP signal from the electric signal, and outputs the data information to the EFM decoder 19. The EFM decoder 19 decodes the data information to output the decoding results to the system controller 22, and the system controller 22 outputs the data information to the external part. This makes reproducing operation.

Next, the case of erasing information having been recorded on the DVD-RW 1. The LD 14 emits a laser light at a lower level of erasing power than that of a recording power. Accordingly, the phase change recording layer 4 of the DVD-RW 1 is heated at a temperature higher than the re-crystallizing temperature but lower than the melting point, and the part of the amorphous state is re-crystallized. As a result of this, the recorded information is erased.

In the present embodiment, since the DVD drive 11 is provided with the A1-A2 information determiner 21 for selecting any method for the OPC by recognizing the flag, the DVD drive 11 can appropriately adjust the recording power for the DVD-RW 1 on which the flag has been recorded.

Furthermore, in the present embodiment, the γ method is carried out as the OPC when the flag indicates that the method using the asymmetry value is not available for OPC. By virtue of this, the recording power does not far depart from the optimum recording power on the basis of the adoption of the γ method for the second best even in the case where the β method is not available.

Next, a fifth embodiment of the present invention will be described hereinafter. This embodiment is an embodiment of an information recording method for the information recording medium relating to the first embodiment as above-mentioned. Therefore, a DVD-RW and its producing method in the present embodiment are substantially the same as those of the above-mentioned first and second embodiments. A DVD drive in the present embodiment is arranged to make it default (priority) that the OPC controller 23 (see FIG. 8) carries out a multi β method as OPC. A multi β method is directed to a method of using an asymmetry value β3 obtained by calculation based on a 11T single signal and a 3T single signal and an asymmetry value β4 obtained by calculation based on an 11T single signal and a 4T single signal to find out a recording power such that the β3 is equal to the β4, thereby to learn the optimum powers. The multi β method has been one invented by the present inventors. This is based on a recognition that a recording power in which the β3 value is mutually equal to the β4 value substantially corresponds to the optimum recording power. As to a detail of the multi β method is set forth in a specification of DVD-R/RW. Constitution and operation about the DVD drive in the present embodiment, which have not been described above, are much the same as those of the third and fourth embodiments described above. Effects and advantages in the present embodiment are also the same as those in the above-mentioned first to fourth embodiments.

Next, a sixth embodiment of the present invention will be described. FIG. 9 is a block diagram showing a DVD drive according to the present embodiment. In this embodiment, a flag indicating whether or not the asymmetry value is available, namely, the information indicating whether the value of (A1-A2) as above-mentioned is no less than a reference value or less than a reference value is not recorded on the DVD-RW. The constitution of the DVD-RW in the present embodiment, that has not been mentioned above is substantially the same as that of the first embodiment described previously. On the other hand, the DVD drive is provided with functionality of calculating the above-mentioned value of (A1-A2) by itself before activating the OPC and enabling the check about whether or not the β method is available for the OPC.

As shown in FIG. 9, a DVD drive 31 of the present embodiment is provided with an A1-A2 information checker 32 instead of the A1-A2 information determiner 21, as compared with the DVD drive 11 of the first embodiment shown in FIG. 8. The A1-A2 information checker 32 is connected to the LPP decoder 20 and the system controller 22, and checks whether or not the above-mentioned flag has been recorded on a DVD-RW 34 that is a recording object to send out the check result to the system controller 22. Then, if the flag has been recorded thereon, it determines whether or not the asymmetry value is available by recognizing the flag to thereby select any method for carrying out the OPC, similarly to the way of the A1-A2 information determiner 21 provided in the DVD drive 11 of the first embodiment.

Furthermore, the DVD drive 31 is provided with an A1-A2 information tester 33 connected to the system controller 22 and the LD driving circuit 25. The A1-A2 information tester 33 issues a command to the LD driving circuit 25 if the A1-A2 information checker 32 has determined that the flag has not been recorded on the DVD-RW 34, to determine a value of (A1-A2). The constitution of the DVD drive 31 of the present embodiment, which has not been mentioned above, is essentially the same as that of the DVD drive 11 in the first embodiment mentioned before.

Next, it will be described a method of adjusting recording conditions of the DVD drive 31 of the present embodiment having the aforementioned constitution. As shown in FIG. 9, the DVD drive 31 starts to read out the flag from the DVD-RW 34 in the similar manner to that of the above-mentioned first embodiment. Here noted is that, although the data on the flag is inputted to the A1-A2 information determiner 21 (see FIG. 8) in the first embodiment described above, the data are inputted to the A1-A2 information checker 32 in the present embodiment.

The A1-A2 information checker 32 checks whether or not the flag is recorded on the DVD-RW 34, and outputs the check result to the system controller 22. If the flag is recorded on the DVD-RW 34, the A1-A2 information checker 32, recognizes the flag and determines whether or not the asymmetry value is available, and selects either the β method or the γ method as a method for executing the OPC.

Figure 1:
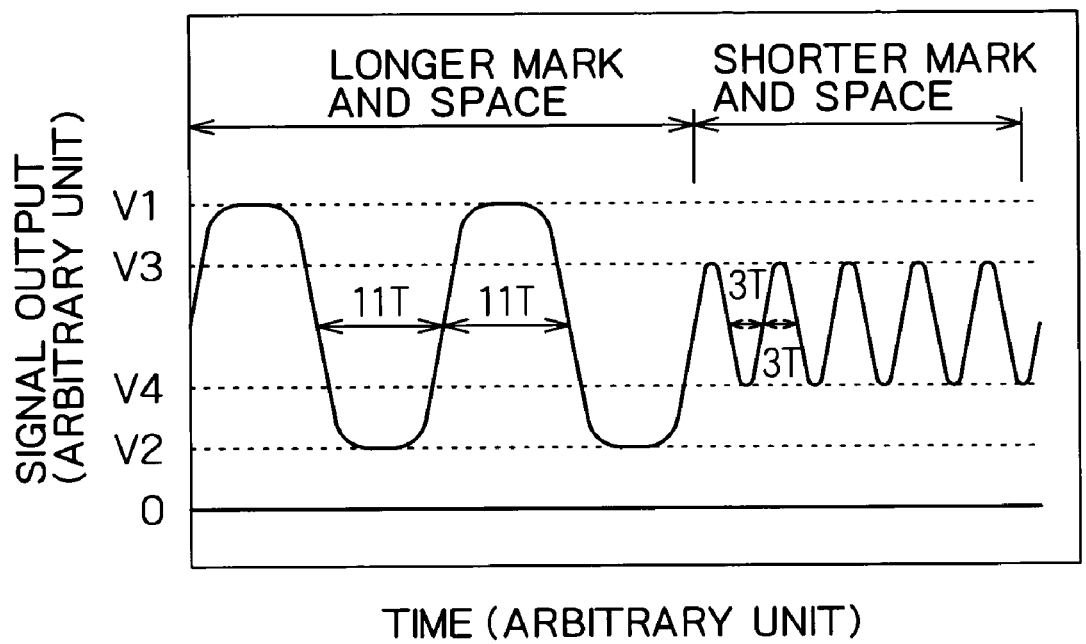
FIG. 1 is a graph for explaining about a definition of an asymmetry value, in which X-axis is defined by time and Y-axis is defined by output of signal.

If the flag is not recorded on the DVD-RW 34, the system controller 22 activates the A1-A2 information tester 33, while it outputs the optimum recording power P1 recorded on the DVD-RW 34 and the corresponding information on the asymmetry value A1 to the A1-A2 information tester 33. Then, the A1-A2 information tester 33 drives the LD driving circuit 25 on the basis of the information on the optimum recording power so as to record a pattern of signal, by which the asymmetry value (β value) can be determined, on the DVD-RW 34 at the optimum recording power P1 and a recording power P2 corresponding to 85% with relative to the recording power P1. A pattern of signal by which the asymmetry value can be determined is directed to, for example, a signal that consists of the 11T single signal and the 3T single signal as shown in FIG. 1.

Next, the OPC controller 23 measures the asymmetry value A1 in the recording power P1 and the asymmetry value A2 in the recording power P2. The A1-A2 information checker 32 compares the value of (A1-A2) with the reference value of 0.05 on the basis of the measurement results, and instructs the system controller 22 to execute the β method for the OPC when the value of (A1-A2) is equal to or greater than 0.05 that is a reference value. On the other hand, the checker 32 instructs the system controller 22 to execute the γ method for the OPC when the value of (A1-A2) is less than 0.05 that is a reference value. The system controller 22 issues a command to the OPC controller 23 in dependence on the instruction to cause it to execute either the β method or the γ method. Accordingly, it is possible to adjust the recording power to the optimum recording power P1. After that, the information is recorded on the DVD-RW 34 at this recording power. The method of recording information is substantially the same as that of the fourth embodiment as above-mentioned. The method of recording, method of reproducing and method of erasing in the present embodiment, that have not been above-mentioned, are likewise the same as those of the fourth embodiment as above-mentioned.

In the present embodiment, the DVD drive 31 is adapted to check whether or not the flag is recorded on the DVD-RW 34 that is a recording object, and determines a value of (A1-A2) by itself if the flag is not recorded thereon to judge whether or not the asymmetry value is available. In this way, it is possible to appropriately select any method of the OPC even for any information recording media on which no flag has been recorded, and to work the OPC satisfactorily. As a result of this, even if a DVD-RW on which the flag is not recorded is used, there is not arisen such a big problem that the optimum recording power is erroneously learned. Effects and advantages in the present embodiment, that have not been mentioned above, are essentially the same as those of the above-mentioned third and fourth embodiments.

It is noted that the numbers, positions, shapes, etc. of the constitutional members in the respective embodiments mentioned above are not restricted to the above-mentioned manner, but more preferred numbers, positions, shapes, etc. of them can be adopted in view of implementing the invention. For instance, the dielectric layer 3 of the DVD-RW 1 shown in FIG. 4 may be formed by stacking a plurality of layers, or may have the respective interfacial layers between the layers of the DVD-RW 1. In addition, although discs corresponding to the DVD-RW have been shown as an information recording medium in the above-described embodiments, the present invention is not limited to it and may effectively applied to any discs as far as the media equivalent to a medium for recording information by means of light and to a phase changeable type disc whose corresponding recording speed (cover range) is relatively wide. For instance, the present invention is effectual for DVD+RW, DVD-RAM and so on. In this case, the information recording device serves as a drive for handling the above-mentioned recording media. Moreover, though the β value given by the above-mentioned equation 2 is used as an asymmetry value in the aforementioned embodiments, the value given by the above-mentioned equation 1 may be used for the asymmetry value.

Next, the effects and advantages of the present invention will be more specifically described with being compared as Comparative examples departing from the claims.

EXAMPLE OF TESTING 1

Figure 10A:
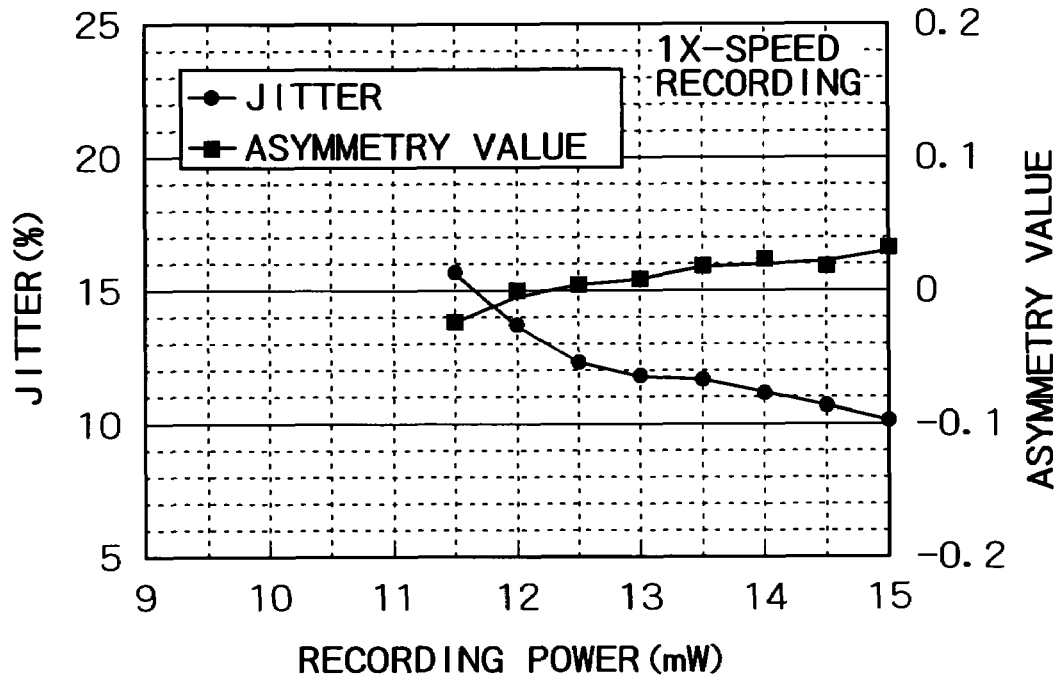
FIG. 10A and FIG. 10B are graphs indicating a recording power dependency of a jitter value and an asymmetry value in a test example 1, in which X-axis is defined by a recording power and Y-axis is defined by a jitter value and an asymmetrical value.
Figure 10B:
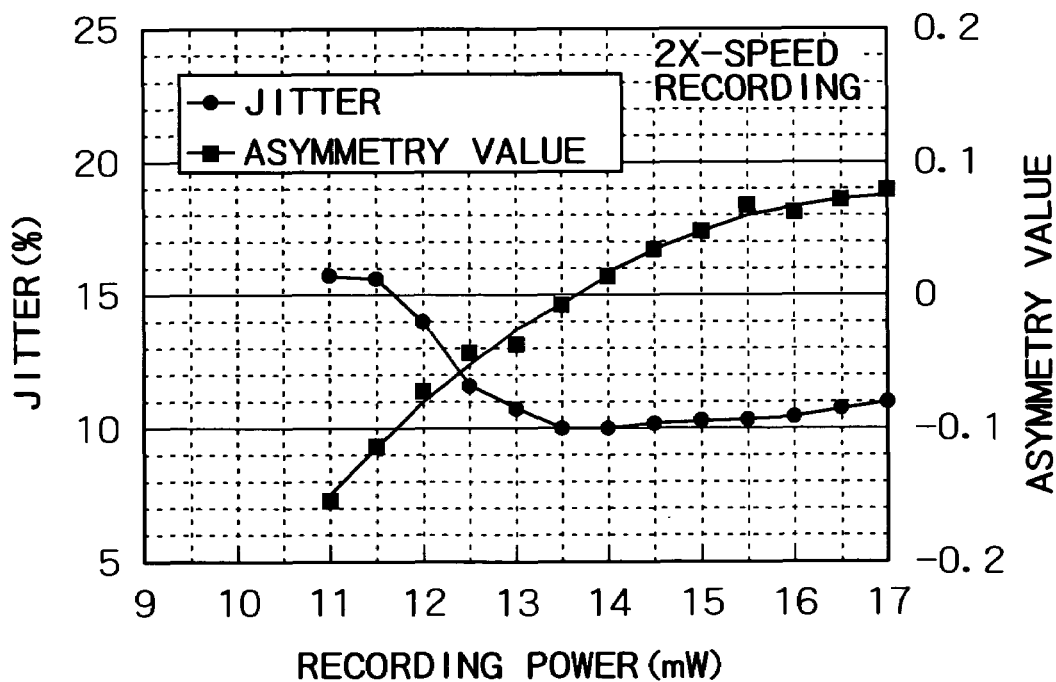

The present example of testing 1 was intended to produce the information recording medium (DVD-RW) and the information recording device (DVD drive) presented in the first embodiment mentioned above, to adjust the recording power in the manner presented in the first embodiment, to actually record information and reproduce the information, and to evaluate the jitter of the reproduced signal. FIG. 10A and FIG. 10B are graphs showing a recording power dependency of the jitter and asymmetry value, where X-axis is defined by a recording power and Y-axis is defined by a jitter and an asymmetry value. FIG. 10A shows the case of a 1×-speed recording, and FIG. 10B shows the case of a 2×-speed recording. It is noted that the asymmetry value has been calculated based on the 11T single signal and the 3T single signal. A wavelength of the laser light was 650 nm, the object lens had a numerical aperture (NA) of 0.6, and a beam shape of the laser light was a perfect circle and its diameter was 0.9 μm. In addition, a channel clock frequency during the 1×-speed recording was set to 26.16 MHz. Additionally, the disc was made to be rotated at a linear velocity of 3.49 m/sec during the 1×-speed recording.

It is noted that the values of the jitter shown in FIG. 10A and FIG. 10B were measured by using an optical head for recording. As described in the first embodiment, the laser light emitted from the optical head for recording has a larger diameter of beam and a lower rim intensity as compared with those of a laser light emitting from the optical head for reproduction. For this reason, if the information recorded on the DVD-RW is reproduced by means of the optical head for recording, the jitter is about 2% higher than in using the optical head for reproduction.

As shown in FIG. 10A, the optimum recording power P1 during the 1×-speed recording is 15 mW, and therefore the recording power P2 was: P2=15 mW×85/100=12.75 mW. Thus, according to FIG. 10A, the asymmetry value A1 was about 0.03, A2 was about 0.01, and thereby the value of (A1-A2) was about 0.02 that was less than 0.05 as a reference value. Further, as shown in FIG. 10B, the optimum recording power P1 during the 2×-speed recording is 13.7 mW, and therefore the recording power P2 was: P2=13.7 mW×85/100≈11.65 mW. Thus, according to FIG. 10B, the asymmetry value A1 was about 0.01, A2 was about −0.11, and therefore the value of (A1-A2) was 0.12 that was equal to or greater than 0.05 as a reference value. This means that the OPC using the asymmetry value, namely, the β method does not well work during the 1×-speed recording, but it well works with no problems during the 2×-speed recording as for this medium.

For this reason, a flag is recorded on the above-mentioned DVD-RW, the flag indicating that the method using the asymmetry value is not available for the OPC in the case of carrying out the 1×-speed recording and the method using the asymmetry value is available for the OPC in the case of carrying out the double speed recording. More specifically, "0000b" indicating that the asymmetry value is available for the 2×-speed recording is recorded in the higher 4 bits in the pre-pit data frame that corresponds to the twelfth relative address of Field. ID6 of the LPP, and "0001b" indicating that the asymmetry value is not available for the 1×-speed recording is recorded in the lower 4 bits in the same frame. Namely, the flag indicates availability of β value in OPC.

Next, after the above-mentioned DVD-RW was inserted in the above-mentioned DVD drive and the OPC took place, the recording operation took place and the jitter was measured. At this time, two kinds of OPC took place. That is, in the example No. 1, the flag recorded on the DVD-RW was read out, and on the basis of the flag, the β method was selected for the OPC if the flag indicates that the asymmetry value is available but, on the other hand, the γ method was selected for the OPC if the flag indicates that the asymmetry value is not available. On the other hand, in the Comparative example No. 2, the flag was not read out from the DVD-RW, and the β method was always selected for the OPC. This result is shown in Table 3. It is noted that an optical head for reproduction is supposed to be used for the DVD-R/RW on the occasion of measuring the quality of the recorded signal. In conformity with it, the jitter values shown in Table 3 are ones obtained by measurement with an optical head for reproduction complying with a specification of the DVD-RW. For this reason, these values are generally lower than those of the jitter shown in FIG. 10A and FIG. 10B.

TABLE 3

| Recording speed | | 1x-speed recording | 2x-speed recording |
|---|---|---|---|
| Value of (A1-A2) | | 0.02 | 0.12 |
| Flag | | Asymmetry value: unusable | Asymmetry value: usable |
| Example No. 1 (use of flag) | OPC | γ method | β method |
| | Jitter [%] | 7.7 | 7.9 |
| Comparative example No. 2 (no use of flag) | OPC | β method | β method |
| | Jitter [%] | 12.5 | 7.9 |

As shown in FIG. 3, since the example No. 1 selected the OPC on the basis of the flag, it obtained satisfactory jitter of 8% or less for both the 1x-speed recording and the 2x-speed recording. On the contrary, since the Comparative example No. 2 used the β method irrespective of the flag, it leads a much higher value of jitter, that was 12.5% during the 1x-speed recording in which essentially the β method is not available. This means that the OPC did not well work during the 1x-speed recording of the Comparative example No. 2 and some problem was arisen.

From the aforementioned view, it has been proved that the DVD-RW shown in the first embodiment as above-mentioned, by virtue of recording the flag thereon, has an extremely much higher reliability in the recording operation. It has also been proved that a drive reading the flag and deciding the OPC operation depending on the flag, as shown in the first embodiment mentioned above has a much higher reliability similarly to in the recording media.

EXAMPLE OF TESTING 2

Figure 11A:
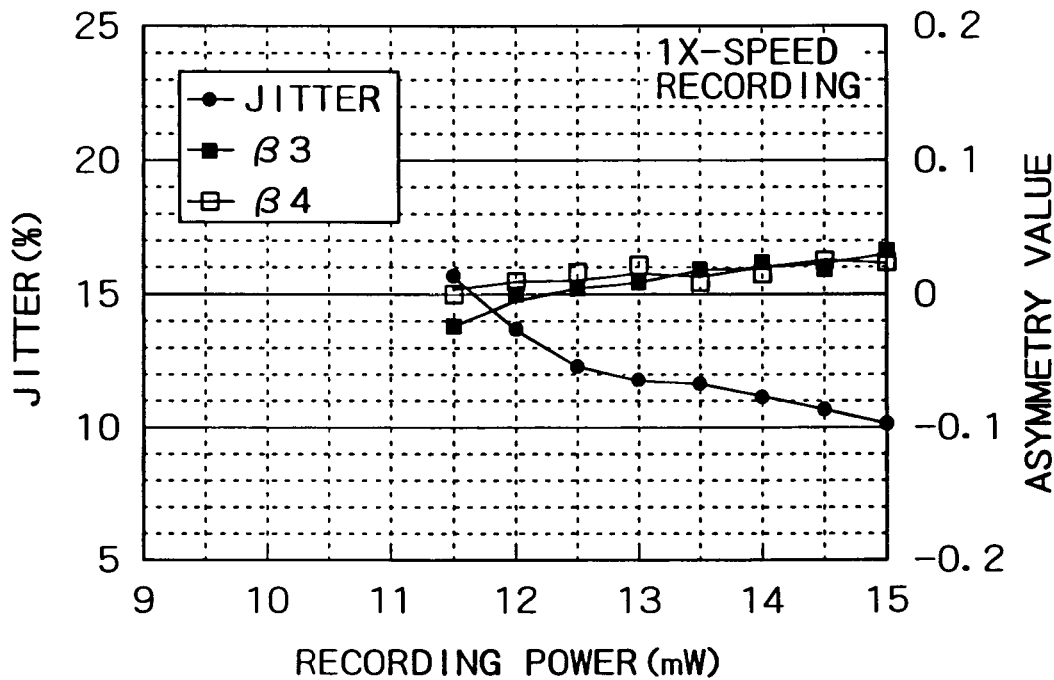
FIG. 11A and FIG. 11B are graphs indicating a recording power dependency of a jitter value and an asymmetry value in a testing example 2, in which X-axis is defined by a recording power and Y-axis is defined by a jitter value and an asymmetry value.
Figure 11B:
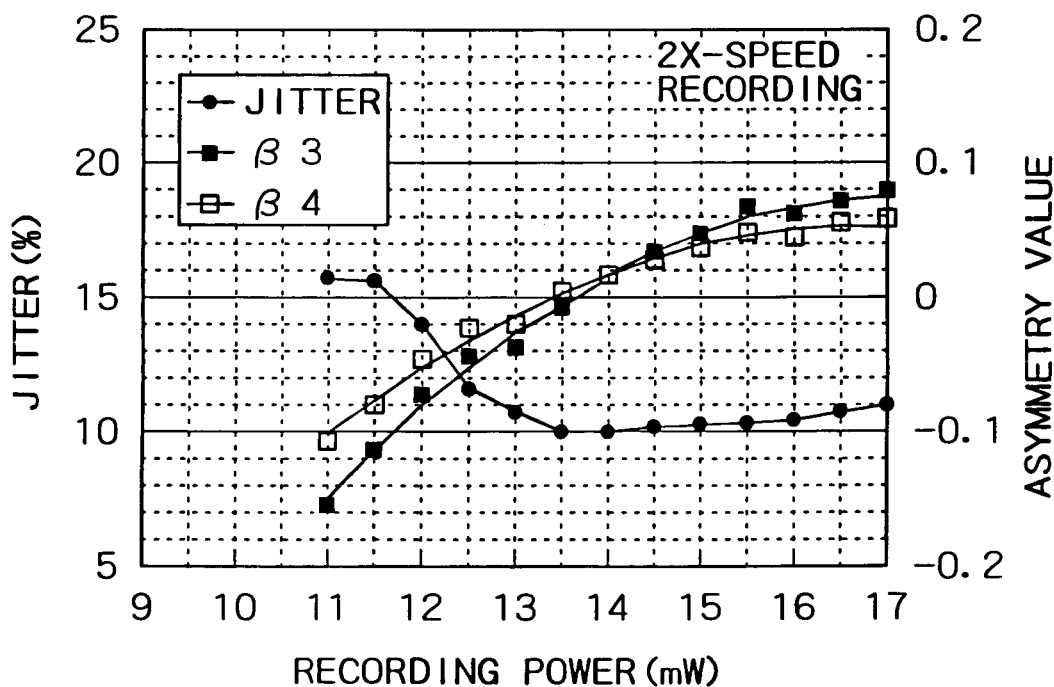

The present example of testing 2 was intended to adjust the recording power in the manner presented in the fifth embodiment mentioned above, to actually record information and reproduce the information, and to evaluate the jitter of the reproduced signal. FIG. 11A and FIG. 11B are graphs showing a recording power dependency of the jitter and asymmetry value, where X-axis is defined by a recording power and Y-axis is defined by a jitter and an asymmetry value. FIG. 11A shows the case of a 1x-speed recording, and FIG. 11B shows the case of a 2x-speed recording. In the example of testing 2, a multi β method was implemented as a β method. That is, the asymmetry value β3 was calculated based on an 11T single signal and a 3T single signal, the asymmetry value β4 was calculated based on an 11T single signal and a 4T single signal, and a recording power such that the β3 value and β4 value are equal to each other was the optimum recording power. The calculation of the value of (A1-A2) was done based on the β3. The measurement conditions of the asymmetry value and jitter in the present example of testing, that have not been mentioned above, were essentially the same as the example of testing 1.

As shown in FIG. 11A, the optimum recording power P1 during the 1x-speed recording is 13.6 mW, and therefore the recording power P2 was: P2=13.6×85/100≈ about 11.6 mW. Thus, according to FIG. 11A, the asymmetry value A1 was about 0.02, A2 was about −0.02, and therefore the value of (A1-A2) was about 0.04 that was less than 0.05 as a reference value. Further, as shown in FIG. 11B, the optimum recording power P1 during the 2x-speed recording is 14.0 mW, and therefore the recording power P2 was: P2=14.0×85/100=11.9 mW. Thus, according to FIG. 11B, the asymmetry value A1 was about 0.02, A2 was about −0.07, and therefore the value of (A1-A2) was 0.09 that was equal to or greater than 0.05 as a reference value. This means that the OPC using the asymmetry value, namely, the multi β method does not well work during the 1x-speed recording, but it works well without any problems during the 2x-speed recording as for this medium.

In addition, as mentioned above, a recording power such the values of β3 and β4 are equal to each other is about 13.6 mW on the occasion of the 1x-speed recording. However, a recording power such that the jitter is minimum is 15 mW in the range of this measurement, so that they are not identical with each other. This means that the multi β method does not well work. On the contrary, in the 2x-speed recording, both a recording power such that the values of β3 and β4 are equal to each other and a recording power such that the jitter is minimum are about 14.0 mW, and thus they have the identical values. This means that the multi β method works well.

Consequently, on the above-mentioned DVD-RW, there is recorded a flag that indicates that the asymmetry value is not available for the OPC in the case of the 1x-speed recording and the asymmetry value is not available for the OPC in the case of the 2x-speed recording.

Next, after the above-mentioned disc was inserted in the above-mentioned drive and the OPC took place, the recording operation took place and the jitter was measured. At this time, two kinds of OPC took place similarly to in the aforementioned example of testing 1. That is, in the example No. 3, the flag recorded on the DVD-RW was read out, and on the basis of the flag, the multi β method or the γ method was selected for the OPC. On the other hand, in the Comparative example No. 4, the flag was not read out from the DVD-RW, and the multi β method was always selected for the OPC operation. This result is shown in Table 4. It is noted that the values of jitter shown in Table 4 are ones obtained by measurement with an optical head for reproduction complying with a specification of the DVD-RW. For this reason, these values are generally lower than those of the values of jitter shown in FIG. 11A and FIG. 11B.

TABLE 4

| Recording speed | | 1x-speed recording | 2x-speed recording |
|---|---|---|---|
| Value of (A1-A2) | | 0.04 | 0.09 |
| Flag | | Asymmetry value: unusable | Asymmetry value: usable |
| Example No. 3 (use of flag) | OPC | γ method | Multi β method |
| | Jitter [%] | 7.5 | 7.7 |
| Comparative example No. 4 (no use of flag) | OPC | Multi β method | Multi β method |
| | Jitter [%] | 11.9 | 7.7 |

As shown in FIG. 4, since the example No. 3 selected the OPC on the basis of the flag, it obtained satisfactory jitter of 8% or less for both the 1x-speed recording and the 2x-speed recording. On the contrary, since the Comparative example No. 4 used the multi β method irrespective of the flag, it leads a much higher value of jitter, that was 11.9% during the 1x-speed recording in which essentially the multi β method is not available. This means that the OPC did not well work during the 1x-speed recording of the Comparative example No. 4 and some problem was arisen.

In this way, since the flag is embedded in the DVD-RW as a medium and the DVD drive selects any method of the OPC on the basis of the flag, it is possible to adjust the recording power stably and satisfactorily.

EXAMPLE OF TESTING 3

In the example of testing 3, by the DVD drive presented in the sixth embodiment mentioned above, the adjustment of the recording power was carried out for the DVD-RW on which the above-mentioned flag has not been recorded, and information was actually recorded thereon and the information was reproduced to evaluate the jitter of the reproduced signal. That is, used for a medium was a DVD-RW on which the flag has not been recorded, and used for an information recording device was a device that has functionality of selecting the β method or the γ method for the OPC by determining an asymmetry value of the medium, calculating the value of (A1-A2) from the determination results, and comparing that value with a reference value being "0.05". The measurement conditions of the asymmetry value and the jitter in the present example of testing, that have not been mentioned above, are essentially the same as in the aforementioned example of testing 1.

After the above-mentioned DVD-RW was inserted in the above-mentioned DVD drive and the OPC took place, the recording operation took place and the jitter was measured. At this time, two kinds of OPC took place. That is, in the example No. 5, an asymmetry value of the DVD-RW is measured at first, and a value of (A1-A2) was calculated to compare it with a reference value so as to determine whether or not the asymmetry value is available, and subsequently either the β method or the γ method is selected for the OPC on the basis of the determination results. On the other hand, in the Comparative example No. 6, such a determination was not carried out, but the β method was always selected for the OPC. This result is shown in Table 5. It is noted that the values of jitter shown in Table 5 are ones obtained by measurement with an optical head for reproduction.

TABLE 5

| Recording speed | | 1x-speed recording | 2x-speed recording |
|---|---|---|---|
| Value of (A1-A2) | | 0.02 | 0.12 |
| Judgment | | Asymmetry value: unusable | Asymmetry value: usable |
| Example No. 5 (use of flag) | OPC | γ method | β method |
|  | Jitter [%] | 7.5 | 7.7 |
| Comparative example No. 6 (no use of flag) | OPC | β method | β method |
|  | Jitter [%] | 11.9 | 7.7 |

As shown in Table 5, since the example No. 5 determined a value of (A1-A2) of the DVD-RW before performing the OPC and selected the OPC on the basis of the determination result, it obtained satisfactory jitter of 8% or less for both the 1x-speed recording and the 2x-speed recording. On the contrary, since the Comparative example No. 6 used always the β method, it leads a much higher value of jitter, that was 11.9% during the 1x-speed recording in which essentially the β method is not available. This means that the OPC did not well work during the 1x-speed recording of the Comparative example No. 6 and some problem was arisen. As described above, it is understood that a drive that determines a value of (A1-A2) of the medium before the OPC and decides the OPC operation based on the determination result leads to a drive having a high reliability.

What is claimed is:

1. An information recording medium that contains information at a predetermined position of said information recording medium indicating whether an asymmetry value is available for adjustment of a recording condition, the information being based on a comparison result between asymmetry values obtained from signals recorded under at least two or more recording conditions, wherein a first asymmetry value at a first recording power in which jitter becomes minimum is compared with a second asymmetry value at a second recording power that is smaller than said first recording power, wherein if a difference between said first asymmetry value and said second asymmetry value is greater than or equal to a predetermined value, said information indicates that adjustment of the recoding conditions using the asymmetry values is possible, while if a difference between said first asymmetry value and said second asymmetry value is less than the predetermined value, said information indicates that adjustment of the recoding conditions using the asymmetry values is not possible.

2. An information recording medium having a predetermined portion that contains a flag that indicates whether an asymmetry value is available for OPC, the flag being generated using first and second asymmetry values, wherein the first asymmetry value is measured using a first recording power at which a jitter becomes minimum, and the second asymmetry value is measured using a second recording power that is 0.85 times said first recording power.

3. The information recording medium according to claim 2, wherein said flag is recorded such that if a difference between said first asymmetry value and said second asymmetry value is 0.05 or more, an asymmetry value is available for OPC, while if a difference between said first asymmetry value and said second asymmetry value is less than 0.05, an asymmetry value is not available for OPC.

4. An information recording medium on which information is recorded by means of irradiation with light, having a flag recorded on said recording medium, wherein the flag indicates whether or not an intensity of light for recording information can be adjusted on the basis of a correlation between asymmetry values and intensity of light.

5. The information recording medium according to claim 4, wherein said flag indicates that said adjustment is possible if a difference between a first asymmetry value of a first signal recorded with a first intensity of light and an asymmetry value of a second signal recorded with a second intensity of light which is equal to or greater than a reference value, and said flag indicates that said adjustment is not possible if said difference is less than said reference value.

6. The information recording medium according to claim 5, wherein said reference value is 0.05, and said first intensity is an intensity that minimizes jitter of the recorded signal, and said second intensity if 0.85 times said first intensity.

7. The information recording medium according to claim 4, wherein information can be recorded at a plurality of recording speeds, and said flag is set for at least one recording speed.

8. The information recording medium according to claim 7, wherein said plurality of recording speeds include a 1x recording speed and a 2x recording speed, and said flag is set for at least said 1x and 2x recording speeds.

9. The information recording medium according to claim 4, wherein said medium is a DVD-RW.

10. A method of generating a flag comprising the steps of:
measuring a first asymmetry value at a first recording power at which a jitter becomes minimum;

measuring a second asymmetry value at a second recording power which is 0.85 times said first recording power; and generating a flag indicating whether or not an asymmetry value is available for OPC by comparing said first asymmetry value and said second asymmetry value.

11. The method of generating a flag according to claim 10, wherein said flag indicates that an asymmetry value is available for OPC when a difference between said first asymmetry value and said second asymmetry value is 0.05 or more, and an asymmetry value is not available for OPC when a difference between said first asymmetry value and said second asymmetry value is less than 0.05.

12. A method of producing an information recording medium on which information is recorded by irradiation with light comprising the steps of:

producing a confirming recording medium;

using said confirming recording medium to confirm whether or not an intensity of light for recording can be adjusted on a basis of a correlation between an asymmetry value and said intensity of light; and producing an information recording medium on which a flag indicating the confirmation result is recorded.

13. The method of producing an information recording medium according to claim 12, wherein using said confirming recording medium to confirm whether or not an intensity of light for recording can be adjusted comprises:

recording a first signal by means of light at a first intensity on said confirming information recording medium, and recording a second signal by means of light at a second intensity on the medium;

obtaining a first asymmetry value based on said first signal, and obtaining a second asymmetry value based on said second signal;

obtaining a difference between said first asymmetry value and said second asymmetry value; and comparing said difference with a reference value, and wherein said flag indicates that said adjustment is possible when said difference is equal to or greater than said reference value, and said flag indicates that said adjustment is not possible when said difference is less than said reference value.

14. The method of producing an information recording medium according to claim 13, wherein said reference value is 0.05.

15. The method of producing an information recording medium according to claim 13, wherein said first intensity is an intensity that minimizes a jitter of a recorded signal, and said second intensity is 0.85 times as high as said first intensity.

16. The method of producing an information recording medium according to claim 14, wherein said first intensity is an intensity that minimizes a jitter of a recorded signal, and said second intensity is 0.85 times as high as said first intensity.

17. The method of producing an information recording medium according to claim 12, wherein said information recording medium is a medium on which information can be recorded at a plurality of recording speeds, and said flag is set for at least a 1× recording speed.

18. The method of producing an information recording medium according to claim 17, wherein said plurality of recording speeds include a 1× recording speed and a 2× recording speed, and said flag is set for at least said 1× and 2× recording speeds.

19. The method of producing an information recording medium according to claim 16, wherein said information recording medium is a medium on which information can be recorded at a plurality of recording speeds, and said flag is set for at least a 1× recording speed.

20. The method of producing for an information recording medium according to claim 19, wherein said plurality of recording speeds include a 1× recording speed and a 2× recording speed, and said flag is set for at least said 1× and 2× recording speeds.

21. The method of producing an information recording medium according to claim 12, wherein said information recording medium is a DVD-RW.

22. A method of adjusting recording conditions of an information recording medium comprising the steps of: comparing asymmetry values, which are obtained by a signal recorded under at least two recording conditions; and deciding whether an asymmetry value is available for adjustment of the recording conditions, wherein a first asymmetry value at a first recording power at which a jitter becomes minimum is compared with a second asymmetry value at a second recording power that is smaller than said first recording power, wherein if a difference between said first asymmetry value and said second asymmetry value is greater than or equal to a predetermined value, adjustment of the recording conditions using the asymmetry value is carried out, while if difference between said first asymmetry value and said second asymmetry value is less than said predetermined value, adjustment of the recording condition using the asymmetry value is not carried out.

23. A method of adjusting recording conditions of an information recording medium comprising the steps of:

measuring a first asymmetry value at a first recording power at which a jitter becomes minimum;

measuring a second asymmetry value at a second recording power that is 0.85 times said first recording power;

measuring a difference between said first asymmetry value and said second asymmetry value; and determining that if a difference between said first asymmetry value and said second asymmetry value is 0.05 or more, said asymmetry value is available for OPC, while if a difference between said first asymmetry value and said second asymmetry value is less than 0.05, said asymmetry value is not available for OPC.

24. A method of adjusting recording conditions of an information recording medium comprising the steps of:

measuring a first asymmetry value at a first recording power at which a jitter becomes minimum;

measuring a second asymmetry value at a second recording power that is 0.85 times said first recording power;

generating a flag indicating whether or not an asymmetry value is available for OPC by comparing said first asymmetry value and said second asymmetry value; and adjusting recording conditions based on said generated flag.

25. The method of adjusting recording conditions of an information recording medium according to claim 24, wherein said flag indicates that if a difference between said first asymmetry value and said second asymmetry value is 0.05 or more, an asymmetry value is available for OPC, while if a difference between said first asymmetry value and said second asymmetry value is less than 0.05, said asymmetry value is not available for OPC.

26. A method of recording for an information recording medium on which information is recorded with light, and which contains a flag indicating whether or not an intensity of light for recording information can be adjusted on the basis of a correlation between asymmetry values and said intensity of light, comprising the steps of:

reading out said flag from said information recording medium;

if said flag indicates that said adjustment is possible, adjusting said intensity of light based on said correlation; and recording information on said information recording medium with said light.

27. The method of recording for an information recording medium according to claim 26, wherein said intensity of light is adjusted on the basis of an amplitude of a reproduced signal of the information recorded on said information recording medium when said flag indicates that said adjustment is not possible.

28. The method of recording for an information recording medium according to claim 26, wherein said flag is set such that a first signal is recorded on said information recording medium by means of light at a first intensity and a second signal is recorded on said medium by means of light at a second intensity to obtain a first asymmetry value based on said first signal and a second asymmetry value based on said second signal and to thereby obtain a difference between said first asymmetry value and said second asymmetry value, and the difference is compared with a reference value so that said flag indicates that the adjustment is possible when said difference is equal to or greater than said reference value and said flag indicates that the adjustment is not possible when said difference is less than said reference value.

29. The method of recording for an information recording medium according to claim 28, wherein said reference value is 0.05.

30. The method of recording for an information recording medium according to claim 28, wherein said first intensity is an intensity that minimizes jitter of a recorded signal, and said second intensity is 0.85 times as high as said first intensity.

31. The method of recording for an information recording medium according to claim 29, wherein said first intensity is an intensity that minimizes jitter of a recorded signal, and said second intensity is 0.85 times as high as said first intensity.

32. The method of recording for an information recording medium according to claim 26, wherein information representing an asymmetry value when the jitter becomes minimum is recorded on said information recording medium, and said intensity of light is adjusted using said information representing the asymmetry value.

33. The method of recording for an information recording medium according to claim 26, wherein said intensity of light is adjusted such that a first asymmetry value obtained based on a first period signal and a second period signal having a longer period than that of the first period signal is identical with a second asymmetry value obtained based on a third period signal and a fourth period signal having a longer period than that of the third period signal.

34. The method of recording for an information recording medium according to claim 26, wherein said information recording medium is a medium on which information can be recorded at a plurality of recording speeds, and said flag is set for at least a 1× recording speed.

35. The method of recording for an information recording medium according to claim 34, wherein said plurality of recording speeds include a 1× recording speed and a 2× recording speed, and said flag is set for at least said 1× and 2× recording speeds.

36. The method of recording for an information recording medium according to claim 31, wherein said information recording medium is a medium on which information can be recorded at a plurality of recording speeds, and said flag is set for at least a 1× recording speed.

37. The method of recording for an information recording medium according to claim 36, wherein said plurality of recording speeds include a 1× recording speed and a 2× recording speed, and said flag is set for at least said 1× and 2× recording speeds.

38. The method of recording for an information recording medium according to claim 34, wherein said information recording medium is a DVD-RW.

39. An information recording device for recording information on an information recording medium with light, wherein a flag is recorded on said information recording medium, the flag indicating whether or not an intensity of light for recording can be adjusted on the basis of a correlation between an asymmetry value and said intensity of light, comprising:

a reading section for reading out said flag from said information recording medium;

a first adjustment section for adjusting said intensity of light on the basis of said correlation between an asymmetry value of said information recording medium and said intensity of light;

a selecting section for activating said adjustment section when said flag indicates that the adjustment is possible; and a recording section for recording information on said information recording medium by irradiating said information recording medium with said light.

40. The information recording device according to claim 39, further comprising a second adjustment section for adjusting said intensity of light on the basis of an amplitude of a reproduced signal of the information recorded on said information recording medium, said second adjustment section being activated by said selecting section when said flag indicates that said adjustment is not possible on the basis of said correlation.

41. An information recording device for recording information on an information recording medium by irradiating the information recording medium with light, comprising:

a first adjustment section for adjusting an intensity of said light on the basis of a correlation between an asymmetry value of said information recording medium and said intensity of said light;

a signal recording section for recording a first signal on said information recording medium by means of light at a first intensity, while recording a second signal on said information recording medium by means of light at a second intensity;

a selecting section for determining an asymmetry value of said first signal and an asymmetry value of said second signal and calculating a difference between said asymmetry values, and for activating said adjustment section when said difference is equal to or greater than a reference value; and a recording section for recording information on said information recording medium by irradiating said information recording medium with said light.

42. The information recording device according to claim 41, further comprising a second adjustment section for adjusting said intensity of light on the basis of an amplitude of a reproduced signal of the information recorded on said information recording medium, said second adjustment section being activated by said selecting section when said difference is less than said reference value.

43. The information recording device according to claim 41, wherein said reference value is 0.05.

44. The information recording device according to claim 42, wherein said first intensity is an intensity that minimizes jitter of a recorded signal, and said second intensity is 0.85 times as high as said first intensity.

45. The information recording device according to claim 43, wherein said first intensity is an intensity that minimizes jitter of a recorded signal, and said second intensity is 0.85 times as high as said first intensity.

46. The information recording device according to claim 36, wherein said information recording medium is a DVD-RW.

* * * * *